United States Patent
Goldick et al.

(10) Patent No.: US 7,577,688 B2
(45) Date of Patent: Aug. 18, 2009

(54) SYSTEMS AND METHODS FOR TRANSPARENT MOVEMENT OF FILE SERVICES IN A CLUSTERED ENVIRONMENT

(75) Inventors: Jonathan Scott Goldick, San Francisco, CA (US); Jeffrey Tofano, San Jose, CA (US)

(73) Assignee: OnStor, Inc., Campbell, CA (US)

( * ) Notice: Subject to any disclaimer, the term of this patent is extended or adjusted under 35 U.S.C. 154(b) by 496 days.

(21) Appl. No.: 10/803,111

(22) Filed: Mar. 16, 2004

(65) Prior Publication Data

US 2005/0210084 A1 Sep. 22, 2005

(51) Int. Cl.
*G06F 17/30* (2006.01)
*G06F 7/00* (2006.01)

(52) U.S. Cl. .................. 707/204; 707/205; 707/102; 707/10

(58) Field of Classification Search .......... 707/1, 707/10, 102, 104.1, 200, 201, 202–205, 101; 714/4; 709/229; 711/148
See application file for complete search history.

(56) References Cited

U.S. PATENT DOCUMENTS

| | | | |
|---|---|---|---|
| 5,860,116 A * | 1/1999 | Washington | 711/148 |
| 6,453,408 B1 * | 9/2002 | Stuart Fiske et al. | 712/29 |
| 6,466,898 B1 | 10/2002 | Chan | |
| 6,484,224 B1 | 11/2002 | Robins et al. | |
| 6,606,690 B2 | 8/2003 | Padovano | |
| 6,732,104 B1 | 5/2004 | Weber | |
| 6,807,572 B1 | 10/2004 | Yu | |
| 6,845,395 B1 | 1/2005 | Blumenau et al. | |
| 6,920,579 B1 * | 7/2005 | Cramer et al. | 714/4 |
| 6,920,580 B1 * | 7/2005 | Cramer et al. | 714/4 |
| 7,039,828 B1 * | 5/2006 | Scott | 714/4 |
| 7,089,293 B2 | 8/2006 | Grosner et al. | |
| 7,117,303 B1 * | 10/2006 | Zayas et al. | 711/112 |
| 7,181,578 B1 | 2/2007 | Guha et al. | |
| 7,266,555 B1 | 9/2007 | Coates et al. | |
| 7,313,614 B2 | 12/2007 | Considine et al. | |
| 2003/0023784 A1 | 1/2003 | Matsunami et al. | |

(Continued)

OTHER PUBLICATIONS

U.S. Appl. No. 10/733,991, Robert Fozard, Systems and Methods for Storage Filing, Dec. 10, 2003.
U.S. Appl. No. 11/021,436, Jonathan Scott Goldick, Storage Filing Systems and Methods with Dedicated Processors and Shared Memory, Dec. 23, 2004.
Yuan Chou and John Paul Shen, "Instruction Path Coprocessors," ACM, Department of Electrical and Computer Engineering @ Carnegie Mellon University, 270-281.

(Continued)

*Primary Examiner*—Kuen S Lu
(74) *Attorney, Agent, or Firm*—Carr & Ferrell LLP

(57) ABSTRACT

Systems and methods transparently move a file service in a clustered environment of storage filers. A first storage filer generates file service data for the file service. The first storage filer associates the file service with an identification. The first storage filer allocates the file service data to at least one memory page in the first storage filer based on the identification. The first storage filer determines an indication to transfer the file service. The first storage filer then transfers at least one memory page using the identification to a second storage filer.

33 Claims, 19 Drawing Sheets

U.S. PATENT DOCUMENTS

| | | |
|---|---|---|
| 2003/0097454 A1* | 5/2003 | Yamakawa et al. .......... 709/229 |
| 2003/0135650 A1* | 7/2003 | Kano et al. ................. 709/248 |
| 2003/0149736 A1* | 8/2003 | Berkowitz et al. .......... 709/213 |
| 2003/0236919 A1 | 12/2003 | Johnson et al. |
| 2004/0015638 A1 | 1/2004 | Forbes |
| 2004/0128654 A1 | 7/2004 | Dichter |
| 2004/0133607 A1 | 7/2004 | Miloushev et al. |
| 2005/0015475 A1 | 1/2005 | Fujita et al. |
| 2005/0071546 A1 | 3/2005 | Delaney et al. |
| 2005/0177770 A1* | 8/2005 | Coatney et al. ............... 714/15 |

\* cited by examiner

SYSTEMS AND METHODS FOR TRANSPARENT MOVEMENT OF FILE SERVICES IN A CLUSTERED ENVIRONMENT

CROSS-REFERENCE TO RELATED APPLICATIONS

This application hereby incorporates by reference U.S. application Ser. No. 10/733,991 filed on Dec. 10, 2003 and titled "Systems and Methods for Storage Filing."

BACKGROUND OF THE INVENTION

1. Field of the Invention

The present invention relates generally to the field of computer systems and more particularly to file servers for storage networks.

2. Description of the Prior Art

Communication networks continue to expand with a greater number of users accessing larger data files at faster speeds. Subsequently, file servers on these communication networks have also evolved to manage a greater number of files and handle a greater number of file requests from more nodes on the communication network. To meet this expanding demand, computer servers have been designed to act as file servers that "serve" files to users and/or devices connected to the communication network.

FIG. 1 depicts a symbolic diagram of a workstation used as a file server in the prior art. A system 100 represents a typical architecture of first generation file servers, which are basically high-end general-purpose workstations. One example of this system 100 is a workstation from Sun Microsystems. The file server of system 100 runs standard software but is dedicated to serving files from locally attached storage. The system 100 includes five main modules: a host CPU 110, a LAN controller 120, a SCSI adapter 130, a tape controller 140, and a disk controller 160. These five main modules are interconnected by a system bus 180.

The advantages of using standard workstations for file serving are relatively low development and production costs. The system 100 can expand local storage (usually externally) via the SCSI bus 132 and allows multiple and more efficient LAN controllers. The disadvantages of using a standard workstation as a file server are that performance and reliability are low because of the general-purpose operating system and software being utilized.

FIG. 2 shows a symbolic diagram of a dedicated file server in the prior art. The system 200 has an architecture in which the hardware and software are dedicated or customized to the file serving application. One example of the system 200 is a file server from Auspex Systems of Santa Clara, Calif. The system 200 includes five main modules: a host CPU 210, a network processor 220, a system memory 230, a file processor 240, and a storage processor 250. The five modules of system 200 are also interconnected by an embedded system bus 280. Specifically, the system memory 230 is accessible by all the modules via the embedded system bus 280.

The system 200 is characterized by the host CPU 210, the network processor 220, the file processor 240 and the storage processor 250, which are dedicated to running only very specific functions. For example, the network processor 220 executes the networking protocols specifically related to file access; the storage processor 250 executes the storage protocols; the file processor 240 executes the file system procedures; and the host CPU 210 executes the remaining software functions, including non-file networking protocols. The system memory 230 buffers data between the Ethernet LAN network 222 and the disk 270, and the system memory 230 also serves as a cache for the system 200.

Because of the way the software of the system 200 is partitioned, the system 200 can be viewed as two distinct sub-systems: a host sub-system (running a general-purpose operating system (OS)) and an embedded sub-system. The advantage of using the system 200 as dedicated for file serving is principally greater performance than that which could be obtained with standard workstations of the period. Although the performance of the system 200 is greater than previous architectures such as system 100, the cost of the system 200 is much greater, and the expanding application of network file servers creates a demand for a system with an improved performance/cost ratio.

FIG. 3 depicts a symbolic diagram for a system 300 for a file server appliance in the prior art. This system 300 is built from standard computer server motherboard designs but with fully customized software. One example of the system 300 is a file server from Network Appliance of Sunnyvale, Calif. The system 300 includes four main modules: a host CPU 310, a LAN controller 320, a SCSI controller 340, and a system memory 330 that is accessible by all the modules via a system bus 370.

The host CPU 310 controls the system 300 and executes software functions using networking protocols, storage protocols, and file system procedures. The host CPU 310 has its own buses for accessing instruction and data memories, and a separate system bus is used for interconnecting the I/O devices. The SCSI controller 340 interfaces with the disk 360 and the tape 350 on each of the SCSI storage buses 352 and 362, respectively. The advantage of using a dedicated software system on a general-purpose hardware platform is an improved performance/cost ratio and improved reliability since the software is tailored only to this specific application's requirements. The major disadvantage of the system 300 is limited performance, scalability, and connectivity.

The expansion of communication networks has driven the development of storage environments. One such storage environment is called a Storage Area Network (SAN). A SAN is a network that interconnects servers and storage allowing data to be stored, retrieved, backed up, restored, and archived. Most SANs are based upon Fibre Channel and SCSI standards.

FIG. 4 depicts a symbolic diagram of a system 400 with network-attached storage (NAS) filers 410, 420, 430, 440, 450, and 460 for a SAN in the prior art. A NAS is a computer server dedicated to nothing more than file sharing. The NAS filers 410, 420, 430, 440, 450, and 460 are simple to deploy, scalable to multiple terabytes, and optimized for file sharing among heterogeneous clients. However, data-intensive applications can quickly saturate the performance and capacity limits of conventional NAS devices. When this happens, the only solution has been to add servers, effectively adding islands of data. Numerous islands of data forces users to divide and allocate their data to a large number of file servers, thus increasing costs.

Another disadvantage of the NAS filers 410, 420, 430, 440, 450, and 460 is the high management overhead because each device and its associated set of users must be individually managed. As the number of devices grows, the required management bandwidth grows accordingly. Another disadvantage of the NAS filers 410, 420, 430, 440, 450, and 460 is the inflexibility of resource deployment. In environments with multiple NAS filers such as system 400, migrating users and data among servers is a cumbersome process requiring movement of data and disruption to users. Consequently, IT managers tend to reserve some performance and capacity headroom on each device to accommodate changes in demand. This reserved headroom results in a collective over-provisioning that further exacerbates capital and overhead management issues.

What is needed is a file server with an architecture that provides improved scalability in performance, capacity, and connectivity required to interface clients to a storage network.

File servers provide file services to the client such as reading and writing data to and from the storage network. Other file services may include opening files on the storage networks and displaying a tree directory of files on the storage network. Clients, file servers, and devices on the storage network share files by using file sharing protocols such as Common Internet File System (CIFS) protocols and Network File System (NFS) protocols. One goal in providing these file services is to achieve high availability such as 99.999% availability. Unfortunately, the file servers occasionally encounter expected or unexpected problems or delays. For example, a file server occasionally needs to be taken out of service for maintenance. In another example, the file server suffers an unexpected technical problem. Other times, the file servers get overloaded with a number of users, file requests, or connections.

Consequently, a need arises to transfer the file service to another file server to provide a continuous, uninterrupted file service and achieve high availability of the storage network. When transfers of file services are not handled properly, the user experiences delays or undesired results. In one Windows example, when a CIFS service is transferred from one file server to another, the user experiences a pop-up window displaying an error message, and the location of where the user is in the tree directory of files is lost.

One problem with transferring the file services from one file server to another is that the state information is located on both the filer server and the client computer. When transferring the file service, the state information in the file server also needs to be transferred to another file server. Another drawback is that the state information on one machine is not comprehensive for the entire file service. Therefore, the state information in the file server cannot be recreated from the state information in the client computer, which makes transferring the state information on the file server a necessity when transferring file services to another file server. The two sets of state information are complementary and as a whole represent the state of the file service. In one example, a Windows client does not cooperate like a Network File Service client and does not keep enough state information to replay where the Windows client is.

Another problem is caused by the immense amount of data stored on the storage area network. The file server generates a tremendous amount of file management data in order to track and maintain the file access. Some examples of the file management data are file control blocks, file name service, and open file handle. The file management data keeps track of opened files, byte range blocks, and in some cases, tree directories. In one example, the file management data numbers in the millions of objects. When a file service transfer is needed, copying millions of objects individually is impractical, especially in the short period of time that is acceptable for a file service transfer. A user accessing files through the file service may only tolerate a few seconds of delay. In some cases, the allowable time for a file service transfer is less than 10 to 30 seconds.

In one prior art system for checkpointing, one file server copies state information for a file service to another file server during the file service. When the first file server malfunctions, the second file server can continue with the file service because the second file service has a copy of the state information. Maintaining the coherency between the two file servers can be very expensive. Also, copying the state information during the file services reduces the performance of both file servers. Both problems of reduction of performance and increased cost do not make this prior art system practical.

Another problem with this prior art system is the determination of which file server will be the recipient of the file service is made a priori to the conditioning event that necessitates the transfer of the file service. In this prior art system, when the first file server boots up, a connection to the second file server is established. The problem is that the decision to use the second file server is made well before the conditioning event. At the time of the conditioning event, the second file server may be unable to accept the file service due to an overloaded state.

What is needed is a quick, efficient solution for transferring file services between file servers that is transparent to the user.

SUMMARY OF THE INVENTION

The present invention addresses the problems discussed above by moving a file service within a plurality of storage filers. The storage filers are coupled to a communication network and a storage network. A first storage filer generates file service data for the file service. The first storage filer associates the file service with an identification. The first storage filer allocates the file service data to at least one memory page in the first storage filer based on the identification. The first storage filer determines an indication to transfer the file service. The first storage filer then transfers at least one memory page using the identification to a second storage filer.

The first storage filer may identify the second storage filer. In some embodiments, the first storage filer determines whether the second storage filer has adequate memory for at least one memory page. The first storage filer may also transmit a message to communicate with the second storage filer to clients for the file service connected to the communication network. In some embodiments, the first storage filer suspends file operations of the file service. The first storage filer may reduce unused space in at least one memory page. The first storage filer may also fix pointers related to at least one memory page.

The storage filer aggregates all the file service data for a file service into at least one memory page. This aggregation into at least one memory page facilitates a quick and efficient transfer of the file service to another storage filer. Therefore, a large amount of file service data can be quickly transferred in a short period of time. As a result, the user experiences minimal delays in the file service, so the movement of the file service appears transparent to the user.

DETAILED DESCRIPTION OF THE INVENTION

The present invention provides systems and methods for transparent movement of file services in a clustered environment. In order to better understand the present invention, aspects of the environment within which the invention operates will first be described.

Figure 5:
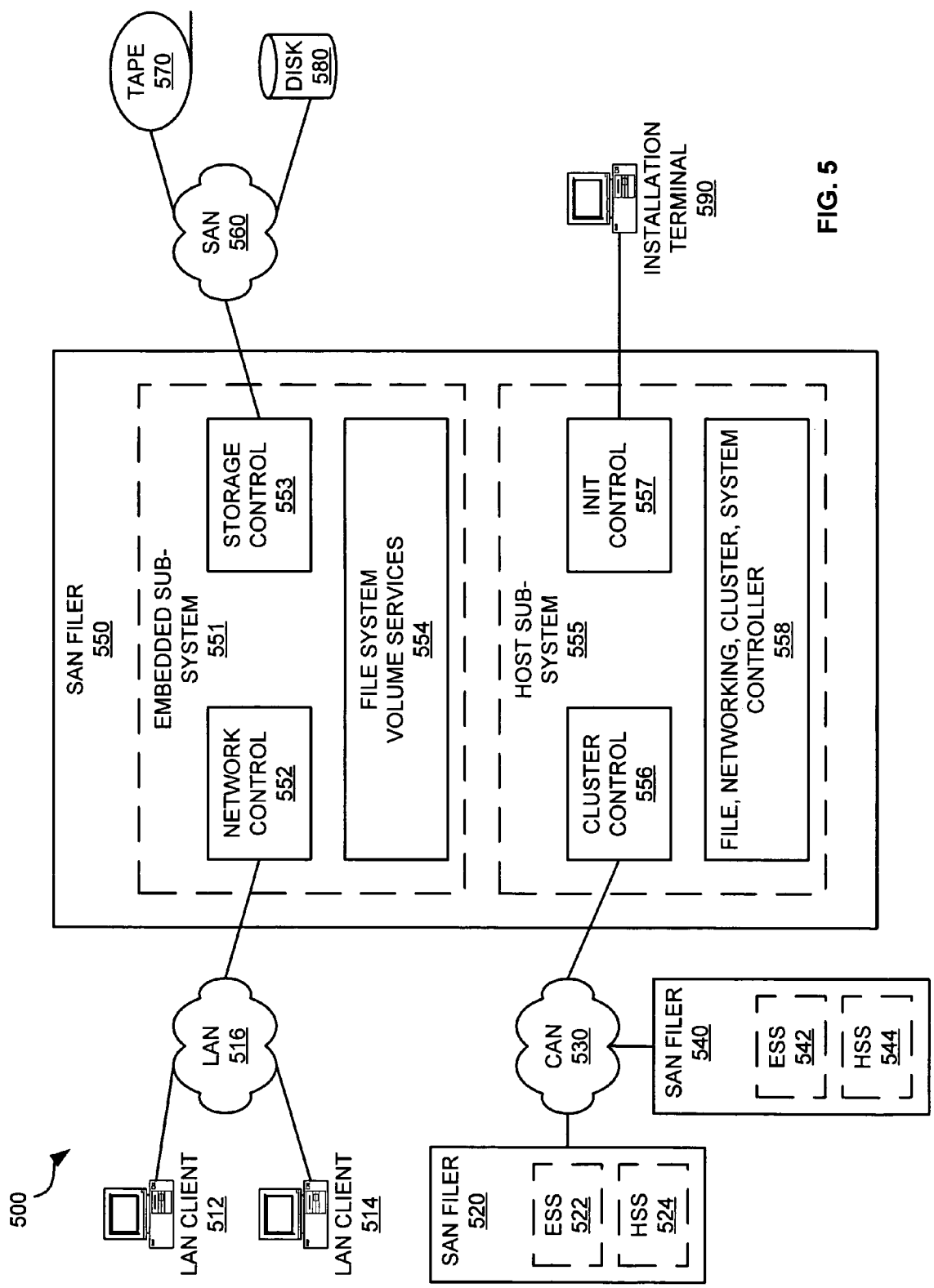
FIG. 5 is a symbolic diagram of a system with a functional view of a SAN filer in an exemplary implementation of the invention.
Figure 6:
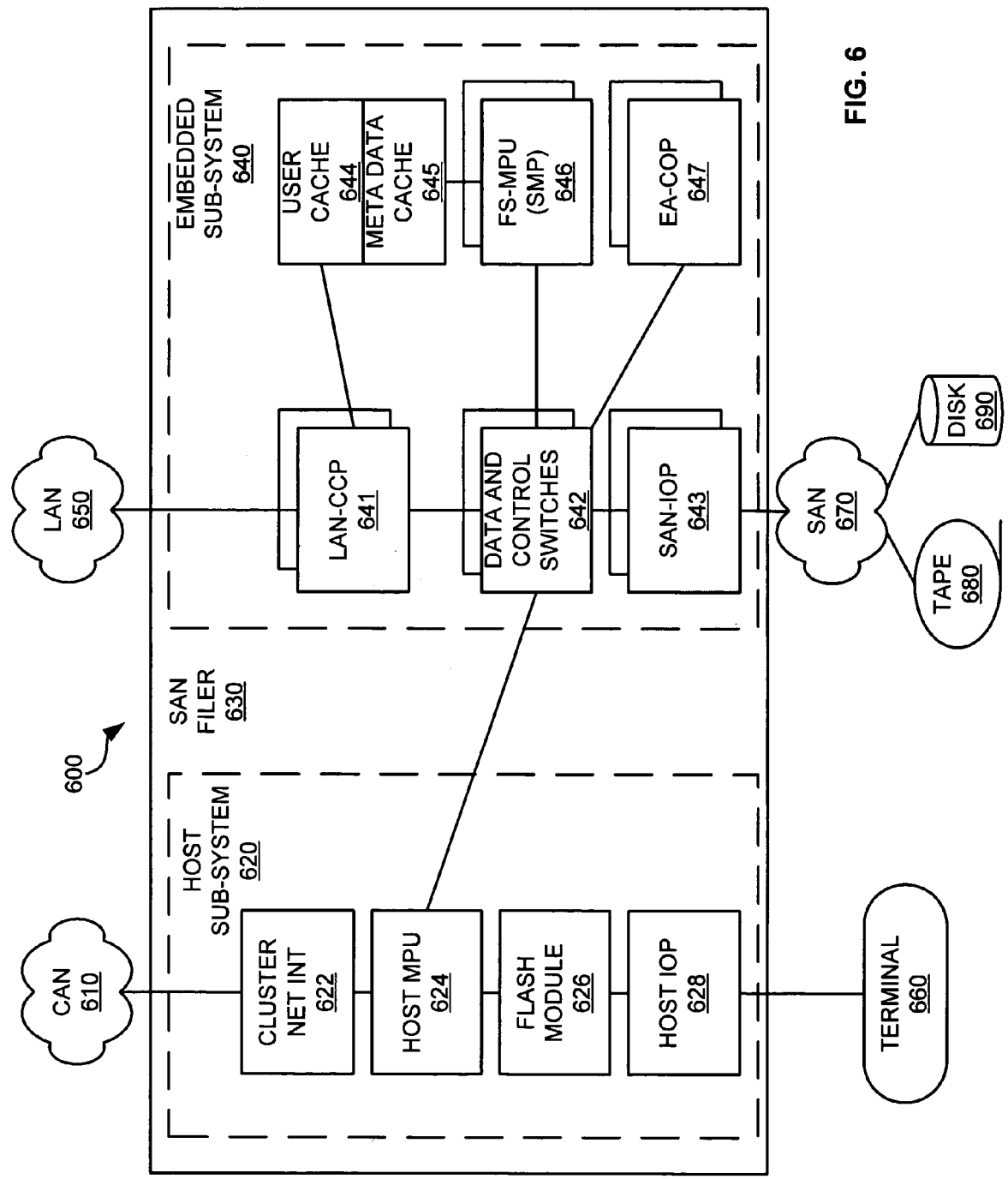
FIG. 6 is a symbolic diagram of a system with a component view of a SAN filer in an exemplary implementation of the invention.
Figure 7:
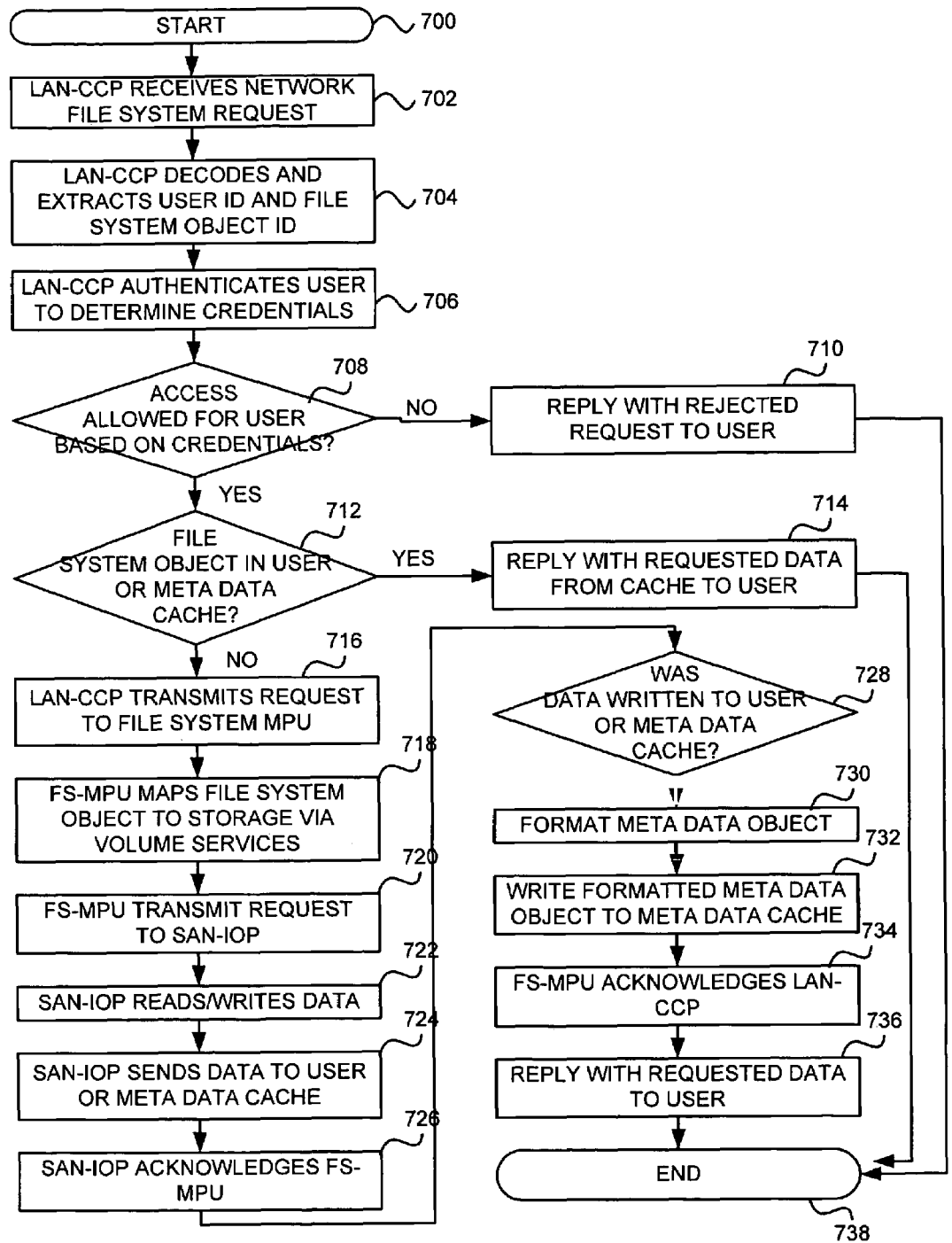
FIG. 7 is a flowchart for a SAN filer in an exemplary implementation of the invention.

SAN Filer Configuration and Operation—FIGS. 5-7

FIG. 5 is a symbolic diagram of a system 500 with a functional view of a SAN filer 550 in an exemplary implementation of the invention. The system 500 includes Local Area Network (LAN) clients 512 and 514, a LAN 516, a SAN filer 520, a Cluster Area Network (CAN) 530, a SAN filer 540, a SAN filer 550, a SAN 560, a tape drive 570, a disk drive 580, and an installation terminal 590.

The LAN clients 512 and 514 are coupled to the LAN 516. Only two LAN clients 512 and 514 are shown for the sake of simplicity. In various embodiments, there are numerous LAN clients 512 and 514 that are coupled to the LAN 516. Other embodiments include any communication network to which users are connected.

The SAN filer 520 and the SAN filer 540 are coupled to the CAN 530. Only three SAN filers 520, 540, and 550 are shown for the sake of simplicity in FIG. 5. In various embodiments, there may be one or more SAN filers 520, 540, and 550 that are coupled to the CAN 530. The SAN filer 520 includes an embedded sub-system (ESS) 522 and a host sub-system (HSS) 524. The SAN filer 540 includes an ESS 542 and an HSS 544. The configuration and operations of the ESSs 522 and 542 and the HSSs 524 and 544 are described in further detail below.

The tape 570 and the disk 580 are coupled to the SAN 560. There are numerous tape drives, disk drives, disk arrays, tape libraries, and other dedicated and/or shared storage resources that may be coupled to the SAN 560, but they are not shown for the sake of simplicity and clarity in order to focus on the SAN filer 550. Also, other embodiments may include any storage network where storage resources are connected in addition to the SAN 560. The storage location is the location at which data on a storage resource resides.

The SAN filer 550 can be considered as a diskless server because all data such as user data, meta data, and journal data is stored on the SAN 560 on storage devices such as conventional Fibre Channel-attached disk arrays and tape libraries. In some embodiments, the SAN filer 550 does not include any captive storage unlike a NAS device. The SAN 560 serves as a multi-purpose data repository shared with application servers and other SAN filers 520 and 540.

The SAN filer 550 includes an embedded sub-system 551 and a host sub-system 555. Both the embedded sub-system 551 and the host sub-system 555 are not physical components within the SAN filer 550. Instead, the embedded sub-system 551 and the host sub-system 555 are delineations for groups of functions and/or components within the SAN filer 550.

In FIG. 5, the elements within the embedded sub-system 551 and the host sub-system 555 are representations of functions that the SAN filer 550 performs. The embedded sub-system 551 includes a network control 552, a storage control 553, and file system volume services 554. The network control 552 interfaces with the LAN 516 using LAN client network protocols. Some examples of these network protocols are Network File System (NFS), Common Internet File System (CIFS), Network Data Management Protocol (NDMP), Simple Network Management Protocol (SNMP), and Address Resolution Protocol (ARP). The network control 552 provides an interface to the file system clients through the LAN 516. In some embodiments, the SAN filer 550 has one or more Gigabit Ethernet ports, able to be link aggregated to form one or more virtual Ethernet interfaces.

The storage control 553 interfaces with the SAN 560 using SAN storage networking protocols. Some examples of the SAN storage networking protocols are FC1 to FC4 and Small Computer System Interface (SCSI). The storage control 553 provides an interface to the storage resources coupled to the SAN 560. In some embodiments, the SAN filer 550 includes one or more Fibre Channel ports to interface with the SAN 560. The file system volume services 554 perform file and volume services such as file system processes and storage volume translation services.

The host sub-system 555 includes a cluster control 556, an initialization control 557, and a file, networking, cluster, system controller 558. The cluster control 556 interfaces with the CAN 530 to other members of the clustered system using certain protocols. Some example of the protocols used by the SAN filer 550 and the CAN 530 are Domain Naming System (DNS), SNMP, and ARP. The cluster control 556 additionally supports communication between the system-level management entity of the SAN filer 550 and other management entities within the customer's data network. In some embodiments, the SAN filer 550 has one or more Ethernet ports to interface with the CAN 530. The initialization control 557 interfaces with the installation terminal 590 to provide initialization of the SAN filer 550 and provide low-level debugging of problems. In some embodiments, the SAN filer 550 has an RS-232 serial port for an interface with the installation terminal 590. The file, networking, cluster, system controller 558 provides overall management of filing, networking, and clustering operations of the SAN filer 550.

FIG. 6 is a symbolic diagram of a system 600 with a component view of a SAN filer 630 in an exemplary implementation of the invention. The system 600 includes a CAN 610, a SAN filer 630, a LAN 650, a terminal 660, a SAN 670, a tape drive 680, and a disk array 690.

The SAN filer 630 includes a host sub-system 620 and an embedded sub-system 640, which are delineations for groups of components within the SAN filer 630. The host sub-system 620 includes a cluster network interface 622, a host main processing unit (MPU) 624, a flash module 626, and a host Input/Output processor (IOP) 628. As a whole, the host sub-system 620 performs LAN network management, SAN network management, volume management, and high-level system control.

The cluster network interface 622 interfaces with the multiple nodes of the CAN 610 of other SAN filers and the host MPU 624. The cluster network interface 622 interfaces with the CAN 610 using protocols such as DNS, SNMP, and ARP. The cluster network interface 622 also interfaces with the SAN filer 630 internal components and the customer-network management entities. In some embodiments, the cluster network interface 622 has one or more Ethernet ports.

The host MPU 624 can be any processing unit configured to provide high-level control of the SAN filer 630. In general, an MPU is a processing unit configured to execute code at all levels (high and low), ultimately direct all Input/Output (I/O) operations of a system, and have a primary access path to a large system memory. Traditionally, an MPU executes the code that is the primary function of the system, which for a file server is the file system. In one embodiment, the host MPU 624 uses a general-purpose operating system such as UNIX to provide standard client networking services such as DNS, DHCP, authentication, etc. The host MPU 624 runs part of the LAN client protocols, SAN networking protocols, file system procedures, and volume management procedures. In some embodiments, the host MPU 624 does not run client applications in order to preserve the security of the system 600.

The flash module 626 holds the operating code for all processing entities within the SAN filer 630. The flash module 626 is coupled to the host MPU 624 and the host IOP 628. The host IOP 628 is an interface to the terminal 660 for initialization and debugging. In some embodiments, the host IOP 628 is an RS-232 interface. In general, an I/O processor (IOP) is a processing unit configured to execute low-level, or very limited high-level code. Typically, an IOP has lots of I/O resources. Some IOPs have a secondary or tertiary access path to the system memory, usually via Direct Memory Access (DMA). Some vendors such as IBM have called their IOPs "Channel Processors," which are not the same as channel coprocessors.

The embedded sub-system 640 includes a LAN-channel coprocessor (CCP) 641, data and control switches 642, SAN-IOP 643, a user cache 644, a meta data cache 645, a file system-MPU (FS-MPU) 646, and an embedded application coprocessor (EA-COP) 647. In some embodiments, the embedded sub-system 640 performs the following functions: file system processes, storage volume translation services, data switching, low-level system control, and embedded (Unix) client applications. In some embodiments, the embedded sub-system 640 uses LAN client networking protocols and SAN storage networking protocols.

In some embodiments, the LAN-CCP 641 can be an array of symmetric multi-processors (SMP) configured to interface with the LAN 650. In other embodiments, the LAN-CCP 641 includes two functional processors. A first functional processor handles Transmission Control Protocol (TCP) and User Datagram Protocol (UDP) processing. A second functional processor handles the CIFS and NFS processing.

In general, coprocessors (COP) execute high-level or specialized code such as scientific or vector routines. Typically, a coprocessor has limited or no I/O resources other than communication with the MPU. Some coprocessors have a primary or secondary access path to the system memory.

Similarly, channel coprocessors execute high-level or specialized code, tightly coupled with the MPU, such as file system or networking routines. The CCP has many I/O resources, such as an IOP, and has an access path to the system memory somewhere between a COP and an IOP. Thus, the CCP is a hybrid of the COP and IOP. A CCP is probably best suited for a dedicated (or embedded) system.

In some embodiments, the channel coprocessor is tightly coupled. Multiprocessors can be loosely or tightly coupled. When multi-processors are loosely coupled, each processor has a set of I/O devices and a large memory where it accesses most of the instructions and data. Processors intercommunicate using messages either via an interconnection network or a shared memory. The bandwidth for intercommunication is somewhat less than the bandwidth of the shared memory. When multi-processors are tightly coupled, the multi-processors communicate through a shared main memory. Complete connectivity exists between the processors and main memory, either via an interconnection network or a multi-ported memory. The bandwidth for intercommunication is approximately the same as the bandwidth of the shared memory.

In FIG. 6, the LAN-CCP 641 is illustrated with a shadow box, which represents the array of multi-processors. In terms of the symmetry of multi-processors, they are either asymmetric or symmetric. Asymmetric multi-processors differ significantly from each other with regard to one or more of the following attributes: type of central processing unit, memory access, or I/O facilities. An important distinction is that the same code often cannot execute across all processors due to their asymmetry.

Symmetric multiprocessors (SMP) are, as the name suggests, symmetric with each other. Symmetric multiprocessors have the same type of central processing unit and the same type of access path to memory and I/O. Normally, the same code can execute across all processors due to such symmetry. SMP means that an individual system can scale easily, merely by adding processors. No rewrite of operating system, file system, or other code running on an SMP array is required. SMP is the cleanest, simplest memory model for software, which results in less development and maintenance bugs, and allows new software developers to become productive more quickly. These benefits provide a more efficient business model for the system vendor.

In some embodiments, the processor in the SMP array includes a coherent memory image, where coherency is maintained via instruction and data caches. Also in some embodiments, the processor array includes a common, shared, cache-coherent memory for the storage of file system (control) meta data. The SMP architecture advantageously provides the optimum memory model in many respects, including: high speed, efficient usage and a simple programming model. Thus, the resultant simple programming model allows reduced software development cost and reduced number of errors or bugs.

In some embodiments, the LAN-CCP 641 runs unbound (state machine) and bound (conventional) multi-threaded programs. An unbound program advantageously improves performance and flexibility. In the case of unbound programs where the program is written in state-machine style, the states may be moved to another processor or a set of processors. At the system level, this feature provides the capability to continue servicing the clients of a server by moving states between multiple servers either for the purpose of balancing load or continuing after a system malfunction.

SMP uniquely allows unbound software modules to be written and executed on the system. Unbound software means tasks can run on any processor in the SMP array, or at a higher level on any system within a cluster. At a low level, unbound means the software tasks may run on any processor within an SMP array within a box. At a high level, unbound means the software tasks and client state may run on any box within a cluster. In summary, unbound software running on an SMP machine will scale more easily and cost-effectively than any other method.

A multi-threaded program can have multiple threads, each executing independently and each executing on separate processors. Obviously, a multi-threaded program operating on multiple processors achieves a considerable speedup over a single-threaded program. In some embodiments, the LAN-CCP 641 includes an acceleration module for offloading the LAN-CCP 641 of low-level networking functions such as link aggregation, address lookup, and packet classification.

The data and control switches 642 are coupled to the LAN-CCP 641, the host MPU 624, the SAN-IOP 643, the FS-MPU 646, and the EA-COP 647. The data and control switches 642 can be any device or group of devices configured to switch information between the LAN-CCP 641, the host MPU 624, the SAN-IOP 643, and the FS-MPU 646. Some examples of this information are user data, file system meta data, and SAN filer control data. In some embodiments, the data and control switches 642 also perform aggregation and conversion of switching links.

The data and control switches 642 advantageously provide a switched system for multiprocessor interconnection for the SAN filer 630 as opposed to shared buses or multi-ported memory. In a switched system, more than one communications path interconnects the functional units, and more than one functional unit is active at a time. A switched interconnect allows the system to be scaled more easily to service very large SANs. Bus-based interconnects, common in most file servers to date, do not scale with respect to bandwidth. Shared memory interconnects do not scale with respect to size and the number of interconnected elements. Only switch-based interconnects overcome these two scaling limitations.

The SAN-IOP 643 can be a multiprocessor unit configured to control and interface with the SAN 670. In some embodiments, the SAN-IOP 643 performs SAN topology discovery. In some embodiments, the SAN-IOP 643 also performs data replication services including replicating user data from cache to disk, from disk to tape, and from disk to disk.

The user cache 644 and the meta data cache 645 are coupled to each other. Also, the user cache 644 and the meta data cache 645 are coupled to the FS-MPU 646 and the LAN-CCP 641. The user cache 644 can be any cache or memory configured to store client user data. The meta data cache 645 can be any cache or memory configured to store file system directory and other control information.

The FS-MPU 646 can be any array of symmetric multiprocessors configured to run programs that execute internal networking protocols, file system protocols, and file system and storage volume services. In some embodiments, the programs are either bound or unbound. Also in some embodiments, the programs are multi-threaded. In FIG. 6, the FS-MPU 646 is illustrated with a shadow box, which represents the array of symmetric multi-processors. In some embodiments, the FS-MPU 646 cooperates with the LAN-CCP 641 and the host MPU 624. In one example, the LAN-CCP 641 handles the meta data cache 645, and the host MPU 624 handles most of the access control. Some examples of file system protocols are NFS, CIFS, and NDMP.

The embedded applications coprocessor (EA-COP) 647 provides a platform to run applications within the ESS 640 and outside the HSS 620. In some embodiments, the applications are UNIX applications. Some examples of applications include license manager and statistics gathering. The EA-COP 647 allows the execution of client applications on a general-purpose operating system but in an environment that is firewalled from the rest of the SAN filer 630. In one embodiment, the EA-COP 647 runs a low-level switch and chassis control application.

The SAN filer 630 incorporates a network processor-based platform optimized for the efficient, high speed movement of data. This is in contrast to other file-serving devices that use conventional server-class processors, designed for general-purpose computing. The specialized data-moving engine in the SAN filer 630 advantageously delivers exceptional performance.

FIG. 7 depicts a flow chart for the SAN filer 630 in an exemplary implementation of the invention. FIG. 7 begins in step 700. In step 702, the LAN-CCP 641 receives a network file system request from one of the LAN clients in the LAN 650 via one of the LAN-CCP 641 media access control interfaces. In other embodiments, the request is any message, signaling, or instruction for requesting data. In step 704, the LAN-CCP 641 decodes the request and extracts the user ID and file system object ID from the network file system request. The decoding and extraction depend upon the client protocol used such as NFS or CIFS. In step 706, the LAN-CCP 641 then authenticates the user to determine the user's access credentials. In step 708, the LAN-CCP 641 checks if access is allowed for the user based on the credentials, user ID, and the file system object ID. If the user is not allowed access of the requested type, the LAN-CCP 641 replies with a rejected request to the user at the LAN client in step 710 before ending in step 738.

If the user is allowed, the LAN-CCP 641 checks whether the file system object is in the user cache 644 or the meta data cache 645 in step 712. If the file system object is in the appropriate cache, the LAN-CCP 641 replies with the requested data from the appropriate cache (the user cache 644 or the meta data cache 645) to the user at the LAN client in step 714 before ending in step 738.

If the file system object is not in the appropriate cache, the LAN-CCP 641 transmits the request to the FS-MPU 646 to further process the client's request. In step 718, the FS-MPU 646 maps or translates the file system object to the storage in the SAN 670 via volume services. In step 720, the FS-MPU 646 transmits one or more requests to the SAN-IOP 643.

The SAN-IOP 643 enters the requests into its work queue, sorting them to optimize the operation of the SAN filer 630 and then executing them at the appropriate time. In step 722, the SAN-IOP 643 reads or writes the data to the storage. In step 724, the SAN-IOP 643 sends the data to the user cache 644 or the meta data cache 645 as requested. In step 726, the SAN-IOP 643 acknowledges the FS-MPU 646. In step 728, the FS-MPU 646 checks whether the data was written to the user cache 644 or the meta data cache 645. If written to the meta data cache 645, the FS-MPU 646 formats the meta data object in step 730. In step 732, the FS-MPU 646 writes the formatted meta data object to the meta data cache 645. In step 734, the FS-MPU 646 then acknowledges the LAN-CCP 641.

In step 736, the LAN-CCP 641 replies with the requested data to the user at the LAN client. FIG. 7 ends in step 738.

Four Configurations for the SAN Filer—FIGS. 8-11

FIGS. 8-11 depict four configurations for the SAN filer.

First Configuration for SAN Filer

Figure 8:
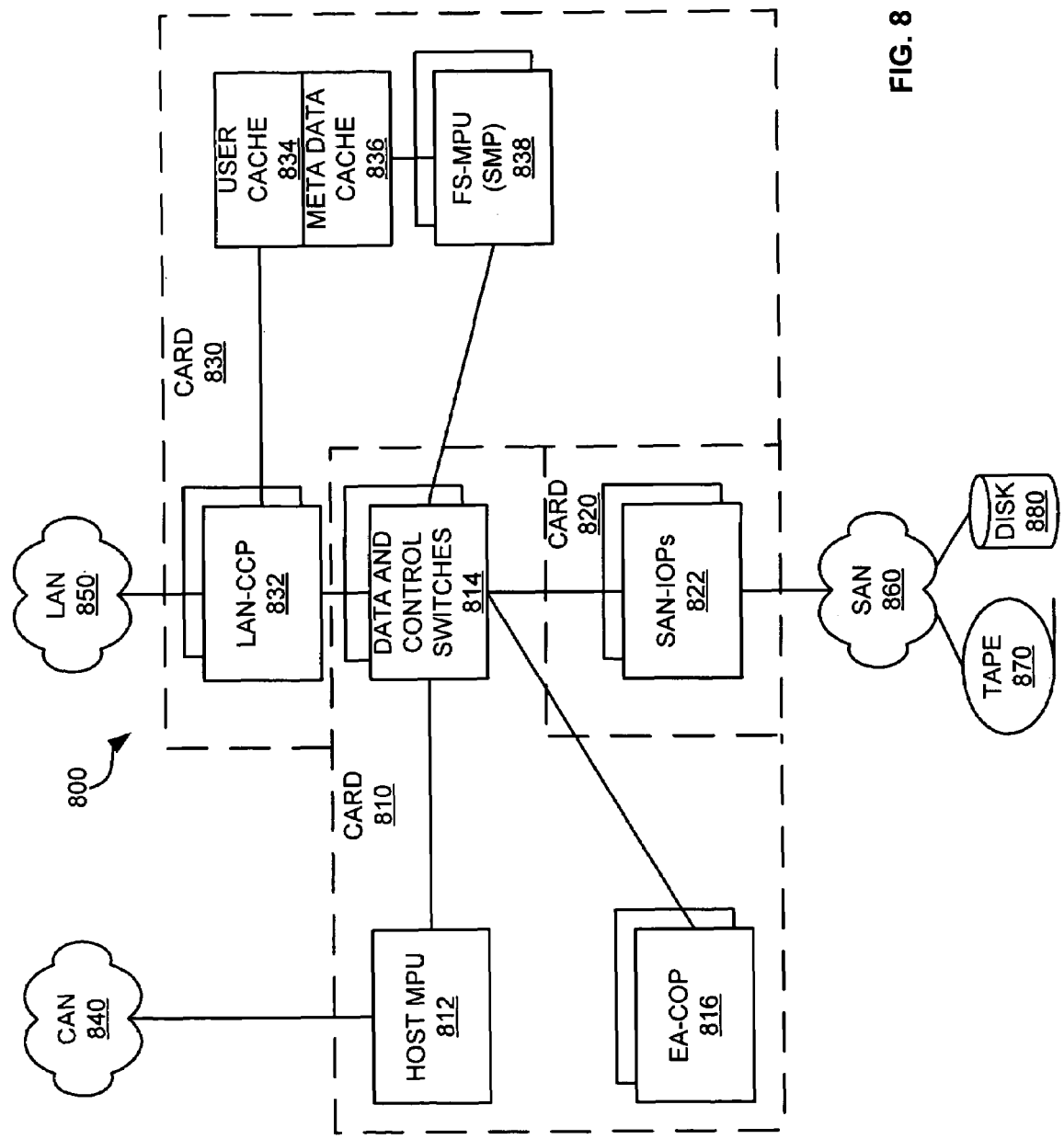
FIG. 8 depicts a symbolic diagram of a system with a SAN filer in a first configuration in an exemplary implementation of the invention.

FIG. 8 depicts a symbolic diagram of a system 800 with a SAN filer in a first configuration in an exemplary implementation of the invention. In this first configuration, the SAN filer comprises three circuit cards: a card 810 called the Switch and System Controller, a card 820 called the Storage Processor, and a card 830 called the File System Processor. The card 810 includes a host MPU 812, data and control switches 814, and an embedded application coprocessor (EA-COP) 816. The card 820 includes one or more SAN-IOP 822s. The card 830 includes a LAN-CCP 832, a user cache 834, a meta data cache 836, and a FS-MPU 838.

The host MPU 812 provides system control to other modules in the three circuit card chassis by the use of a high-speed microprocessor. This processor runs an advanced BSD operating system and applications on top of the operating system, which is needed for management, control, and communication. The host MPU 812 is part of the host sub-system. In some embodiments, the host sub-system also provides various other devices for the system 800 such as a boot ROM, a real-time clock, a watchdog timer, serial ports for debugging, and non-volatile storage (e.g. CompactFlash or Microdrive).

The data and control switches 814 provide interconnection between the host MPU 812, the EA-COP 816, the LAN-CCP 832, the FS-MPU 838, and the SAN-IOP 822. Physically, each circuit card connects within the system via both the data switch and the control switch. The data switch of the data and control switches 814 uses multiple serial links, each of which run at either 1.25 Gbps or 3.125 Gbps. The control switch of the data and control switches 814 uses multiple serial links, each of which run at 100 Mbps or 1 Gbps. In addition to the main data and control switches, the data and control switches 814 include a very slow-speed backplane management interconnect system for sending out-of-band control messages, such as resets and the physical connection status of a card. The EA-COP 816 runs user applications in a general-purpose operating system environment as well as background monitoring of fans, temperature and other mechanical statuses.

In this embodiment for the first configuration, the SAN-IOP 822 is organized as four independent stripes with each stripe providing a Fibre Channel port. The design of each stripe is identical, and with the exception of backplane management functions, the operation control, and management of each stripe are completely independent. Each stripe connects to the rest of the system 800 over two different data paths: control switch (CX) and data switch (DX). One purpose of the CX connection is for downloading code images from the HSS as well as low bandwidth management operations. One purpose of the DX connection is to send and receive data and some control messages to and from other cards in the chassis. Each switch connection has redundant ports for communication with a potential secondary HSS. Each stripe of the SAN-IOP 822 comprises a processor, memory, some I/O, backplane interface, and a Fibre Channel interface. The SAN-IOP 822 also includes four 1G/2G FC ports for a SAN interface.

The LAN-CCP 832 is a symmetric multi-processor array comprising two cache coherent MIPS processors with local instruction and data caches and access to two high-speed DDR SDRAM interfaces. The LAN-CCP 832 supports 8 GB of memory. In a switched version of the first configuration, the FS-MPU 838 connects to the data switch of the data and control switches 814 via a 16-bit FIFO interface supporting up to 3 Gbps operation. In both versions of the first configuration, the LAN-CCP 832 and the FS-MPU 838 interconnect via a HyperTransport interface. The connection to the control switch is via multiple serial interfaces each supporting up to 100 Mbps operation. The LAN-CCP 832 interfaces with the LAN 850 via dual 16-bit FIFO interface to the Look Up and Classifier (LUC) element, supporting up to 3 Gbps operation. The LUC interfaces to four Gigabit Ethernet MACs.

In this embodiment for the first configuration, the FS-MPU 838 is a symmetric multi-processor array comprising two cache coherent MIPS processors with local instruction and data caches and access to two high-speed DDR SDRAM interfaces. The FS-MPU 838 supports a total of 8GB of memory. The FS-MPU 838 connects to the data switches of the data and control switches 814 via dual 16-bit FIFO interfaces supporting up to 3 Gbps operation. The FS-MPU 838 is also connected to the control switches of the data and control switches 814 via multiple serial interfaces each supporting up to 100 Mbps operation.

The Hardware Look-Up and Classifier (LUC) interconnects the four GigE LAN MACs and the LAN-CCP 832 processor array, providing all multiplexer/demultiplexer functions between the MACs and SMP array. The LUC supports flow control in each direction. The LUC performs TCP checksums on ingress and egress packets to offer hardware acceleration to the LAN-CCP. Finally, the LUC also provides a register interface to the system for configuration and statistics of the LAN interface.

In some embodiments, this first configuration is expandable by up to four times in two ways. First, by interconnecting the DX and CX elements of each minimal size system in a hierarchical switching arrangement a 1-to-n scaling of the basic system can be accomplished. Second, by upgrading the SMP arrays from 2-processor to 4-processor elements the processing capacity may be correspondingly increased.

Second Configuration for SAN Filer

Figure 9:
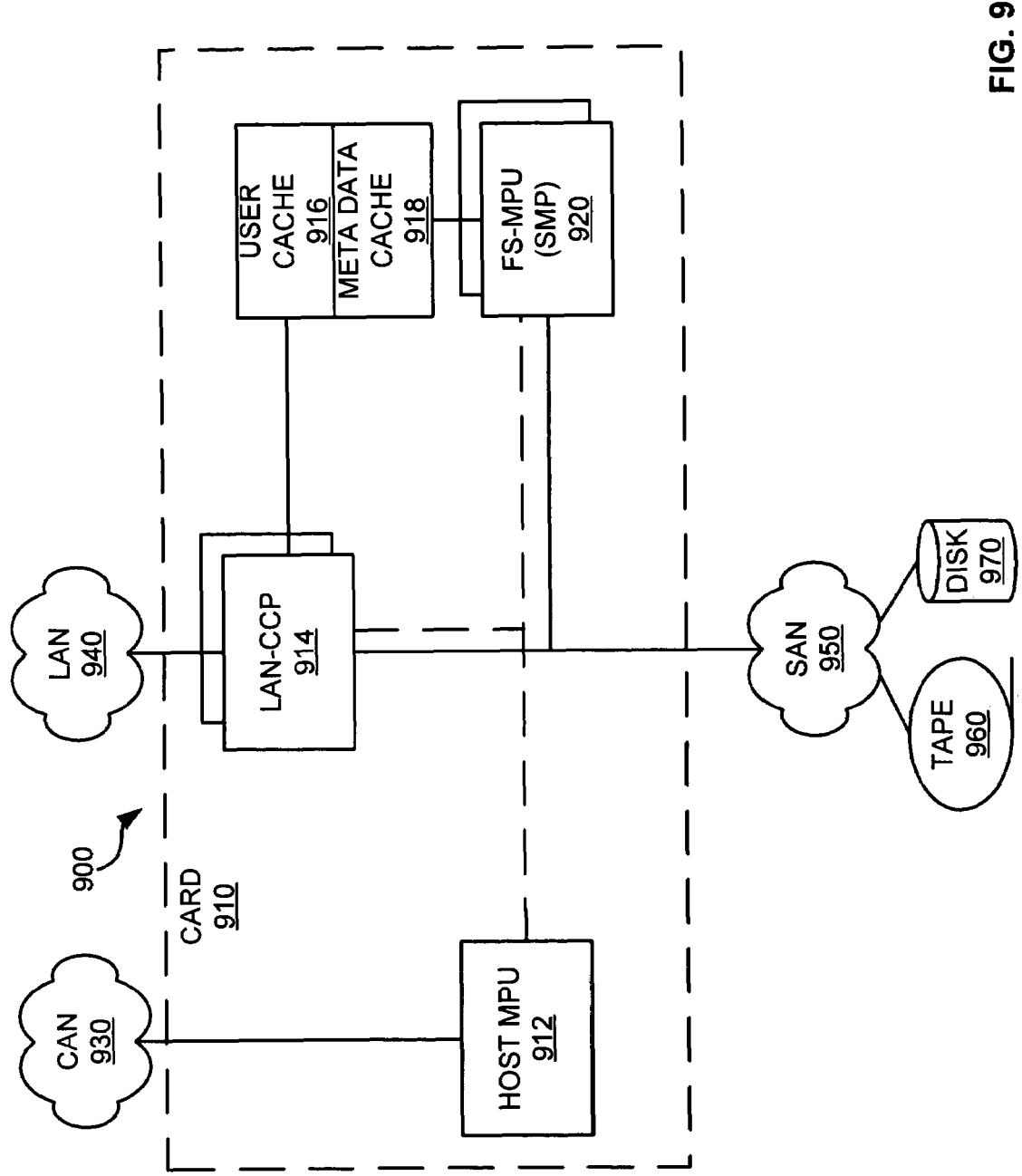
FIG. 9 depicts a symbolic diagram of a system with a SAN filer in a second configuration in an exemplary implementation of the invention.

FIG. 9 depicts a symbolic diagram of a system with a SAN filer in a second configuration in an exemplary implementation of the invention. In this second configuration, the SAN filer comprises only one circuit card called card 1 910. The card 910 can be divided into four sub-sections. A first module is called the Switch & System Control (SSC) and comprises the host MPU 912. A second module is called the File System Main Processing Unit and comprises the FS-MPU 920. A third module is called the LAN Channel Coprocessor (LAN-CCP) and comprises the LAN-CCP 914 and the LUC.

A fourth module is called the SAN I/O processor (SAN-IOP). The SAN-IOP is comprised of two parts: the FC interface module, which is attached to both the FS-MPU 920 and the LAN-CCP 914; and the software module, which can be implemented in four ways: (1) as a separate task wholly contained either within the FS-MPU 920 or the LAN-CCP 914; (2) as separate tasks split between the FS-MPU 920 and the LAN-CCP 914; (3) as an SMP task wholly contained either within the FS-MPU 920 or the LAN-CCP 914; or (4) as an SMP task split between the FS-MPU 920 and the LAN-CCP 914.

The host sub-system runs on the separate CPU of the host MPU 912. The host MPU 912 also includes two 10/100 Ethernet ports for the CAN interface to the CAN 930. The LAN-CCP 914 comprises a 2-processor SMP array. Also, the LAN-CCP 914 has two or four GigE ports for the LAN interface. The FS-MPU 920 comprises a 2-processor SMP array. The FS-MPU 920 also includes two or four 1G/2G FC ports for the SAN interface with the SAN 950. The card 910 includes one RS-232c port for the initialization interface. The user cache 916 and the meta data cache 918 are 2 GB to 8 GB caches. The elements within the card 910 are interconnected by direct-connect data and control paths as opposed to the data and control switches in other embodiments.

Third Configuration for SAN Filer

Figure 10:
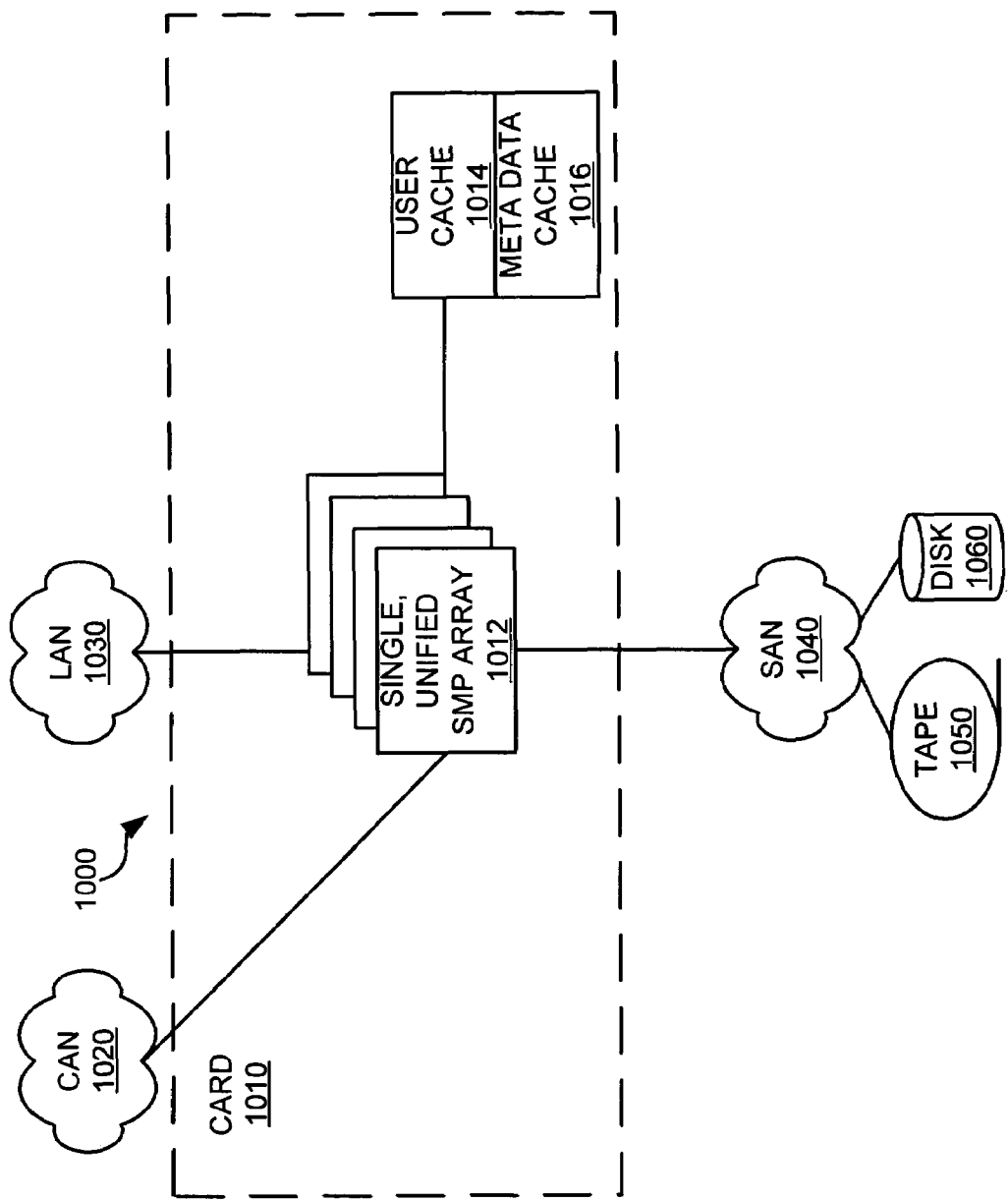
FIG. 10 depicts a symbolic diagram of a system with a SAN filer in a third configuration in an exemplary implementation of the invention.

FIG. 10 depicts a symbolic diagram of a system with a SAN filer in a third configuration in an exemplary implementation of the invention. In this third configuration, the SAN filer includes a single circuit card 1010. The card 1010 includes a single, unified SMP array 1012, a user cache 1014, and a meta data cache 1016. The single, unified SMP array 1012 comprises one large 4-processor SMP array executing all the system functions of the above described FS-MPU, LAN-CCP, SAN-IOP, and host MPU. The single, unified SMP array 1012 includes two or four GigE ports for the LAN interface to the LAN 1030. The single, unified SMP array 1012 also includes two or four 1G/2G FC ports for the SAN interface to the SAN 1040. The single, unified SMP array 1012 includes two 10/100 ports for the CAN interface to the CAN 1020. The card 1010 includes one RS-232c port for the initialization interface. The card 1010 includes a Hardware Look-up and Classifier and internal data and control paths. The user cache 1014 and the meta data cache 1016 comprise 2 GB to 8 GB caches.

Fourth Configuration for SAN Filer

Figure 11:
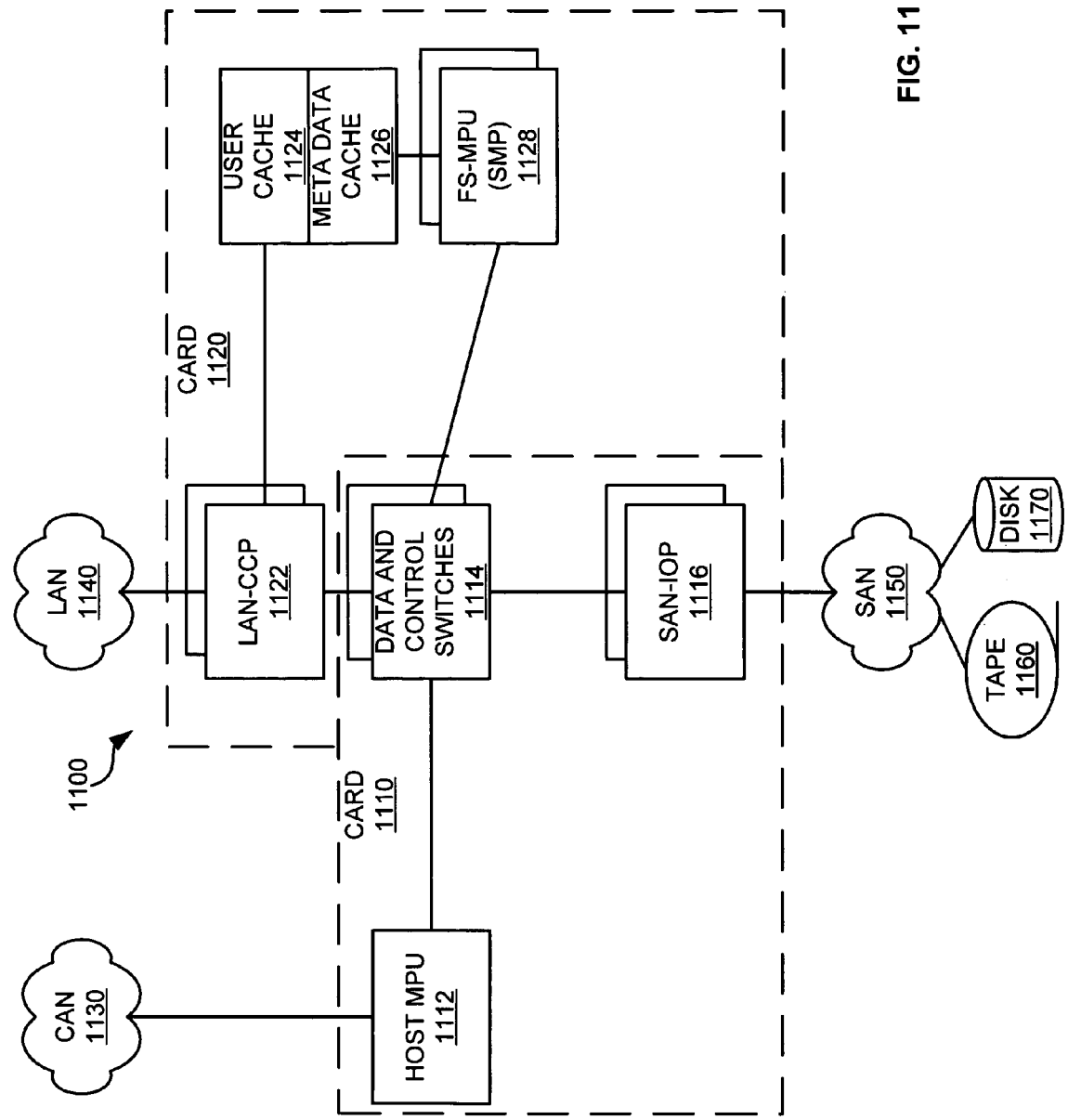
FIG. 11 depicts a symbolic diagram of a system with a SAN filer in a fourth configuration in an exemplary implementation of the invention.

FIG. 11 depicts a symbolic diagram of a system with a SAN filer in a fourth configuration in an exemplary implementation of the invention. In this fourth configuration, the SAN filer comprises two circuit cards: card 1110 and card 1120. Card 1110 comprises the host MPU 1112, the data and control switches 1114, and the SAN-IOP 1116. Card 1120 comprises the LAN-CCP 1122, the user cache 1124, the meta data cache 1126, and the FS-MPU 1128.

The host MPU 1112 comprises a 2-processor SMP array. The host MPU 1112 includes two 10/100/1000 Ethernet ports for the CAN interface to the CAN 1130. The SAN-IOP 1116 comprises a 2-processor SMP array. The SAN-IOP 1116 also comprises four to eight 1G/2G FC ports for the SAN interface to the SAN 1150. The LAN-CCP 1122 comprises a 4-processor SMP array. The LAN-CCP 1122 also includes four to eight GigE ports for the LAN interface to the LAN 1140. The user cache 1124 and the meta data cache 1126 comprise 2 GB to 8 GB caches. The FS-MPU 1128 comprises a 4-processor SMP array. The card 1120 includes one RS-232c port for the initialization interface and a Hardware Look-up Classifier.

Figure 12:
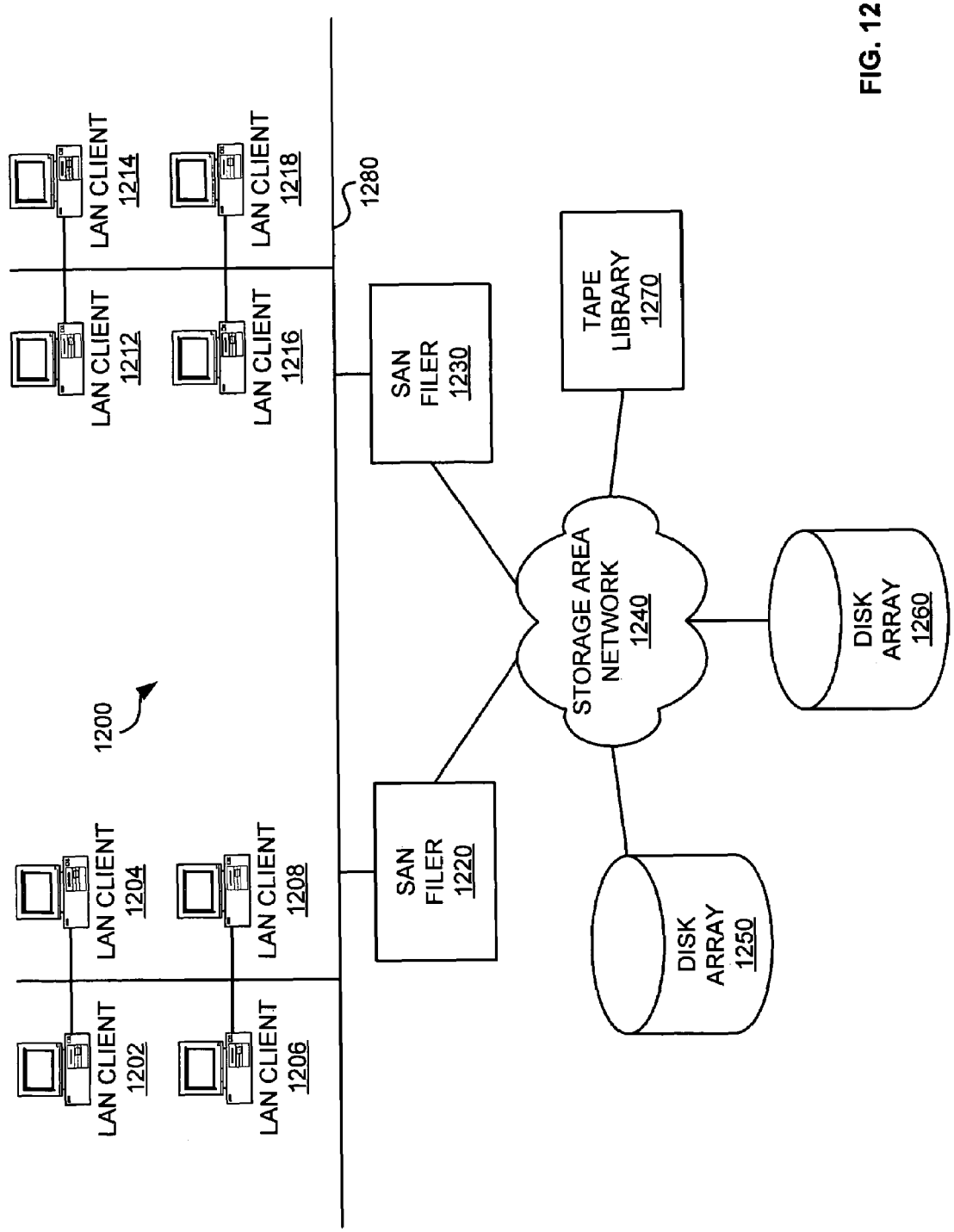
FIG. 12 is a symbolic diagram of a system with multiple SAN filers in an exemplary implementation of the invention.

Multiple SAN Filer Environment—FIG. 12

FIG. 12 depicts a symbolic diagram of a system with multiple SAN filers in an exemplary implementation of the invention. The system 1200 includes LAN clients 1202, 1204, 1206, and 1208, LAN clients 1212, 1214, 1216, and 1218, SAN filer 1220, SAN filer 1230, storage area network 1240, disk array 1250, disk array 1260, and tape library 1270. A network link 1280 interconnects the LAN clients 1202, 1204, 1206, and 1208, the LAN clients 1212, 1214, 1216, and 1218, the SAN filer 1220, and the SAN filer 1230. The SAN 1240 is connected to the SAN filer 1220, the SAN filer 1230, the disk array 1250, the disk array 1260, and the tape library 1270.

Figure 1:
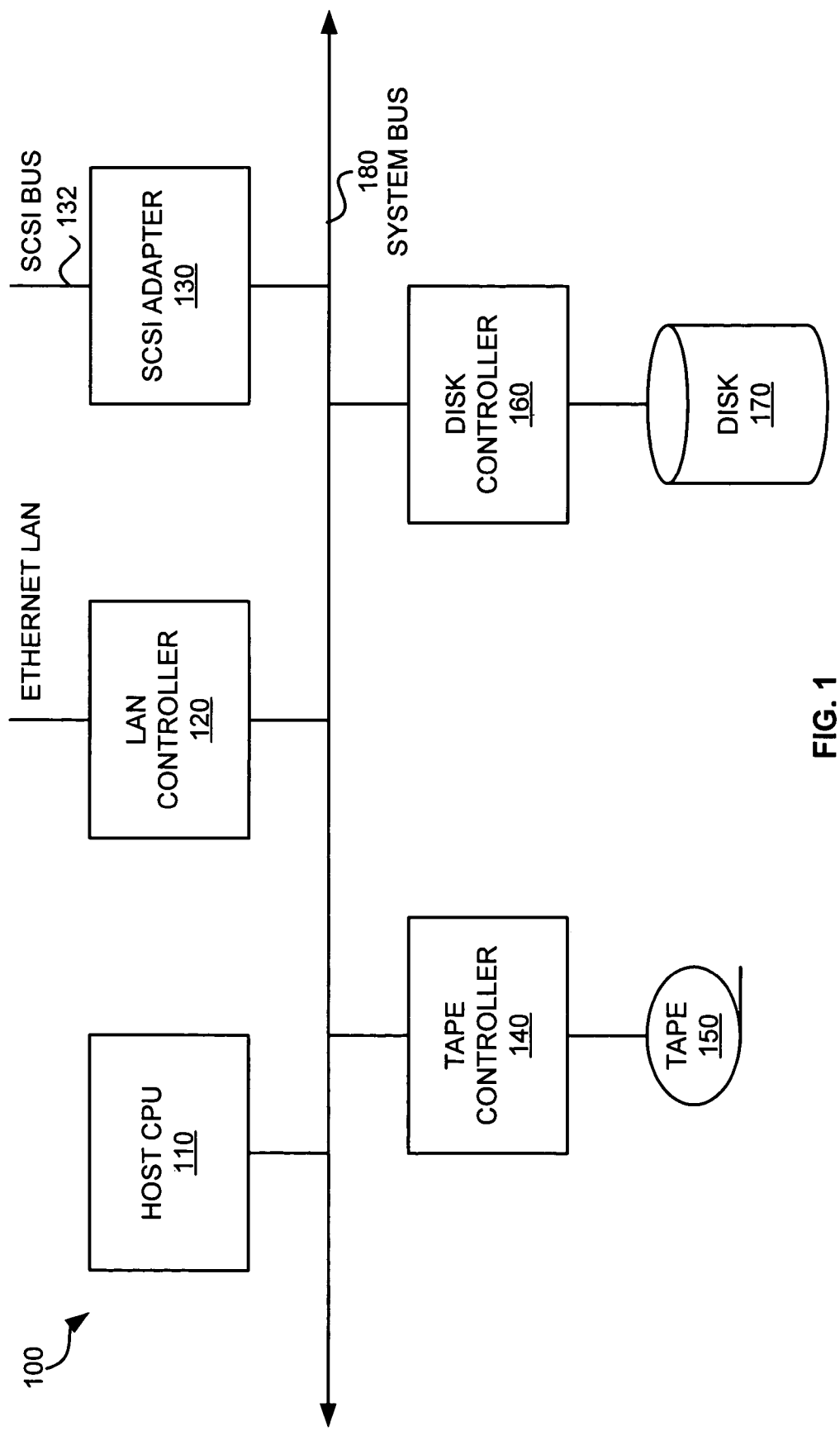
FIG. 1 is a symbolic diagram of a workstation used as a file server in the prior art.
Figure 2:
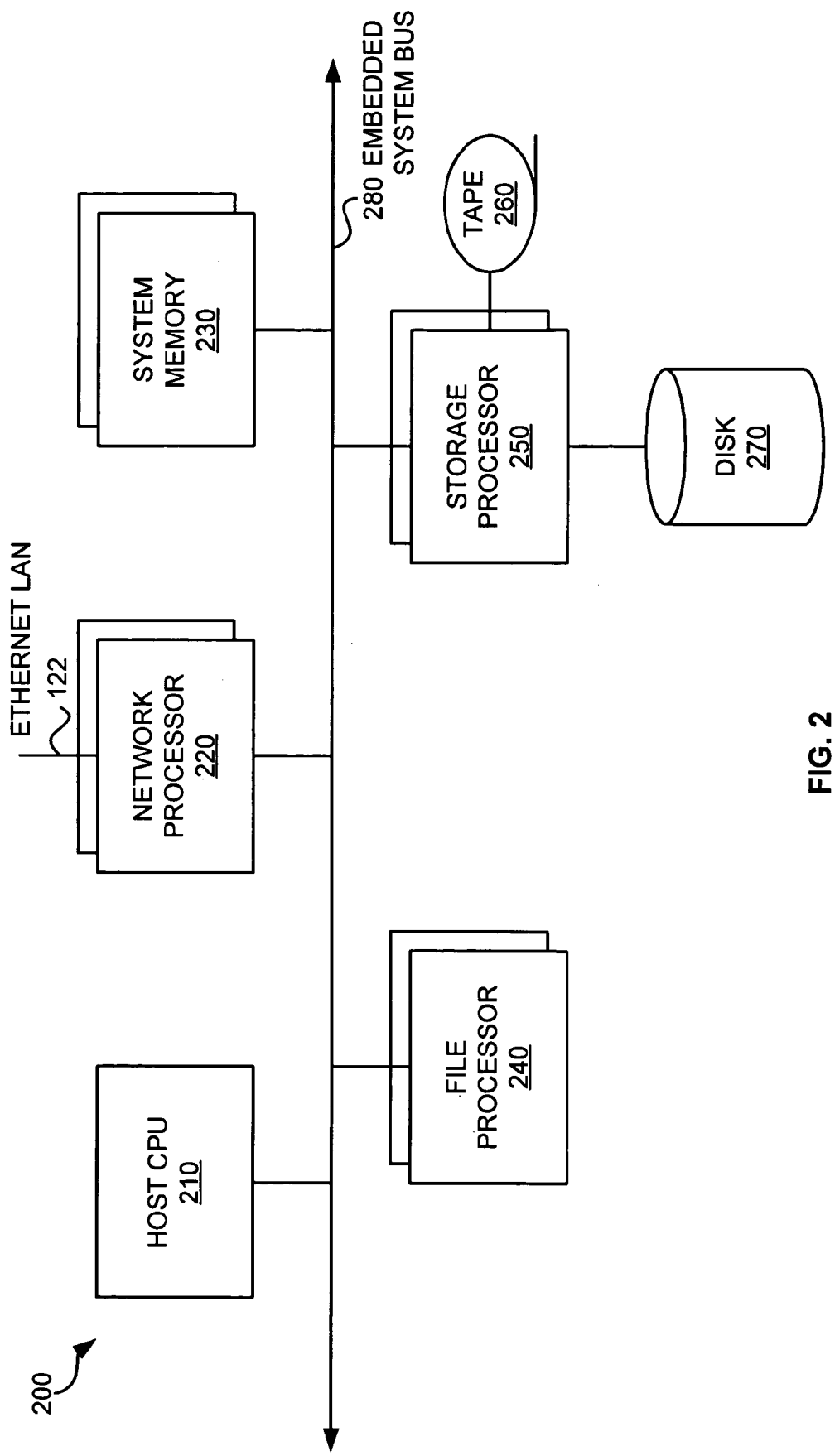
FIG. 2 is a symbolic diagram of a dedicated file server in the prior art.
Figure 3:
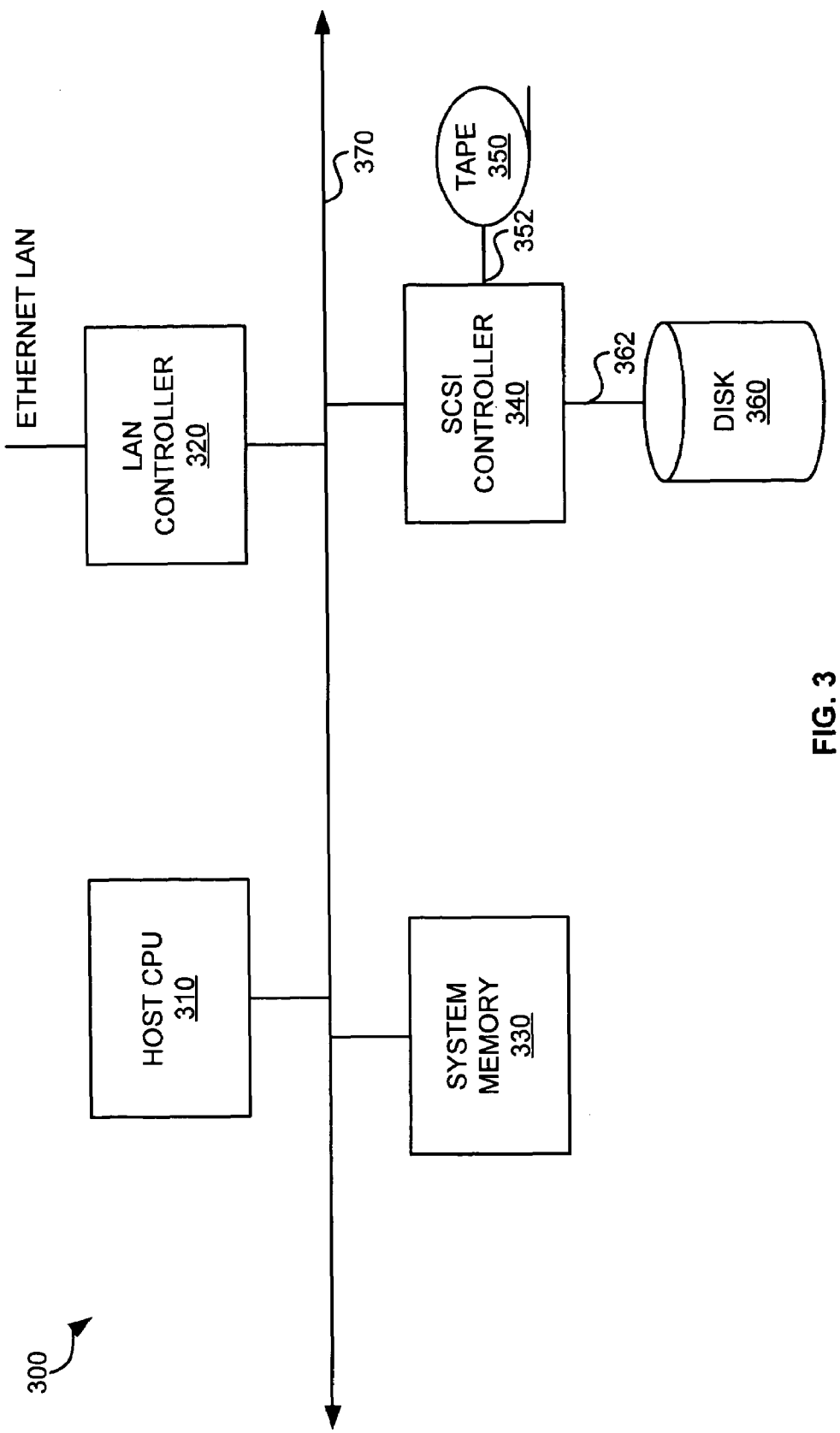
FIG. 3 is a system for a file server appliance in the prior art.
Figure 4:
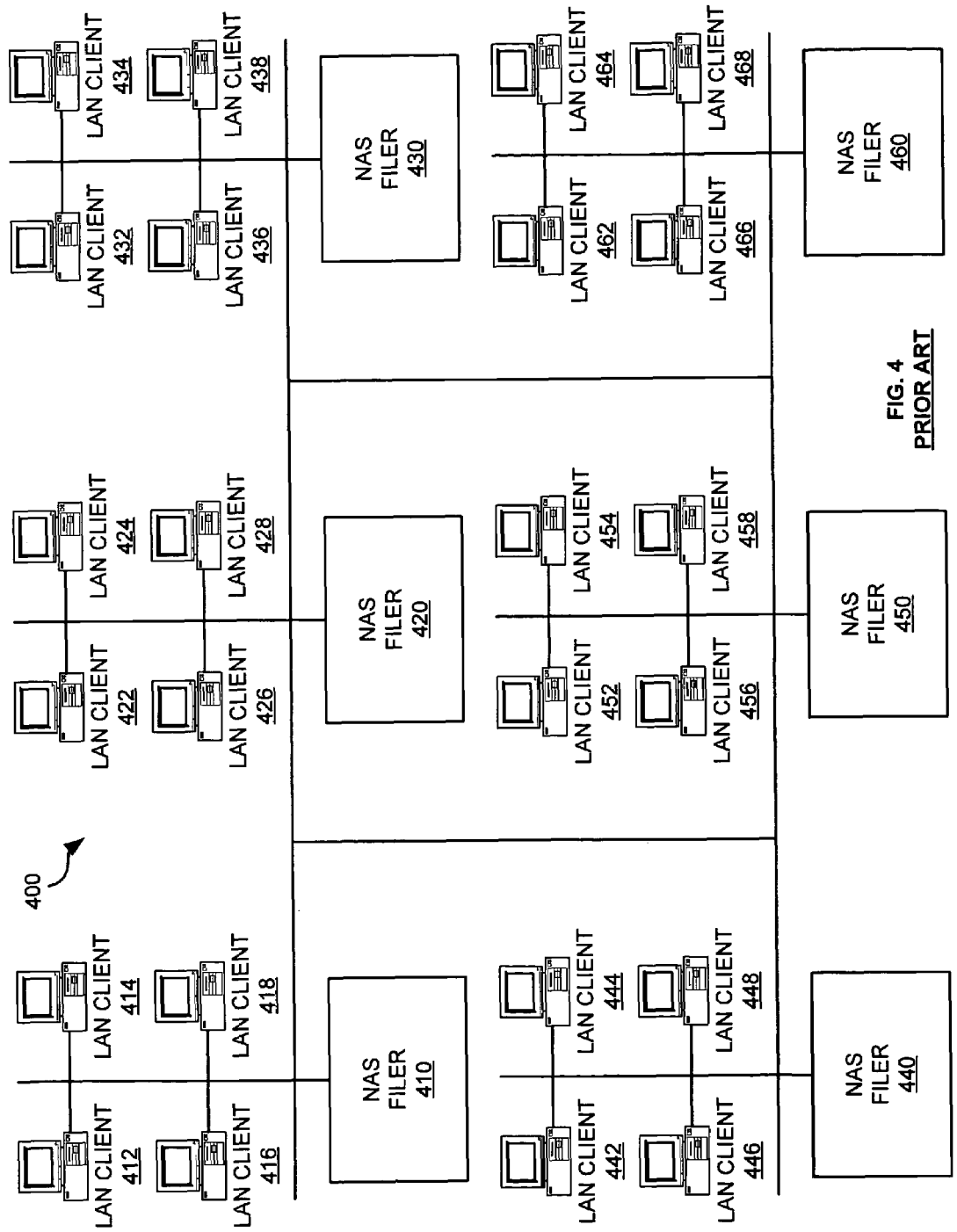
FIG. 4 is a symbolic diagram of a system with NAS filers in the prior art.

Only two SAN filers 1220 and 1230 are shown in FIG. 12 for the sake of simplicity. Other embodiments may include numerous SAN filers to expand file storage. One advantage the SAN filers 1220 and 1230 provide is high system availability through filer pooling. A multiple SAN filer configuration such as the system 1200 in FIG. 2 eliminates single points of failure in two ways. First, the multiple SAN filer configuration permits users or servers to access data through any SAN filer in a multiple-filer environment. If a SAN filer 1220 is taken off-line or is experiencing excessive workload, users may easily be migrated to another SAN filer 1230 with no changes in IP address or server names required. For example if LAN client 1202 is accessing the disk array 1260 through SAN filer 1220, and SAN filer 1220 fails or is overloaded, the LAN client 1202 can still access the disk array 1260 through SAN filer 1230.

Second, filer pooling means that any filer can access data from any storage array. In the SAN filer environment such as system 1200, all data, including file system directories and meta data, are stored on shared devices accessible over the SAN 1240. Any SAN filer can access the data regardless of which SAN filer stored it. Because SAN filers offer petabyte addressability, each filer has essentially unlimited ability to directly access large pools of data. Unlike most virtual file system implementations, no redirection by another filer or meta data server is required. By eliminating both single-points-of-failure and performance bottlenecks, this architecture creates a highly robust storage environment.

The SAN filer's broad interoperability significantly boosts the return-on-investment for the total solution. Unlike systems that are built around vendor's storage device or infrastructure, SAN filers are compatible with a wide range of arrays, switches, and tape libraries. This interoperability has powerful implications for both reducing the cost of high-availability storage and simplifying its integration.

Another advantage is non-disruptive integration. The SAN filer's interoperability extends beyond infrastructure and arrays to storage and device management software as well. This allows SAN filers to integrate with existing procedures and practices without disruption. From data backup processes to SAN management, SAN filers provide a solution that works with existing procedures, rather than replacing them.

The SAN filer also enhances the return on investment by leveraging storage investments already in place. An existing SAN environment can be shared among application servers and SAN filers. Alternatively, components can be redeployed to create a dedicated file storage environment that is accessed by SAN filers. Either way, existing infrastructure can become an integral element of the future file storage solution.

Another advantage is multi-tiered storage flexibility. Not all applications demand the same level of performance and data availability, and it makes sense that data storage systems should have the flexibility to meet these varying requirements. But most file-storage systems are designed around proprietary storage and have little or no ability to include other vendors' solutions. SAN filers have the flexibility to store data on arrays ranging from high-end, high performance sub-systems to the emerging cost-effective SATA-based sub-systems. SAN filers allow IT managers to optimize storage delivery by defining and applying different service levels to specific application requirements. Less demanding applications can be directed to lower-performance, lower-cost storage solutions, while higher end, more expensive storage investments can be reserved for the mission-critical applications that demand that class of storage.

Another advantage is interchangeability. SAN filers share one critical attribute with common network infrastructure components such as switches and routers: interchangeability. Just as data can be flexibly routed through the local area network, SAN filers permit file services to be migrated transparently between filers to support load balancing or availability requirements. If needed, one SAN filer can be replaced with another without disrupting network operations and without moving data.

In some embodiments, another advantage is the stateless architecture with n-way clustering for SAN filers. The SAN filer hardware and software are inherently stateless. All records of ongoing transaction are journaled to SAN-based disk, rather than being stored in the filer itself. With no disk and no non-volatile RAM on board, the SAN filer delivers n-way clustering with capabilities that go beyond conventional clustering. N-way clustering allows one filer to replace another without requiring cache coherency. As with a Fibre Channel fabric switch, the only information that is shared between SAN filers on an ongoing basis is health monitoring and SAN environment mapping. Conventional clustering, by contrast, usually requires that the device maintain cache coherency to facilitate failover. SAN filers remain independent until switchover occurs: at that moment, a SAN filer simply resumes activities where the previous filer left off.

Systems and Methods for Transparent Movement of File Services in a Clustered Environment—FIGS. 13-19

Figure 13:
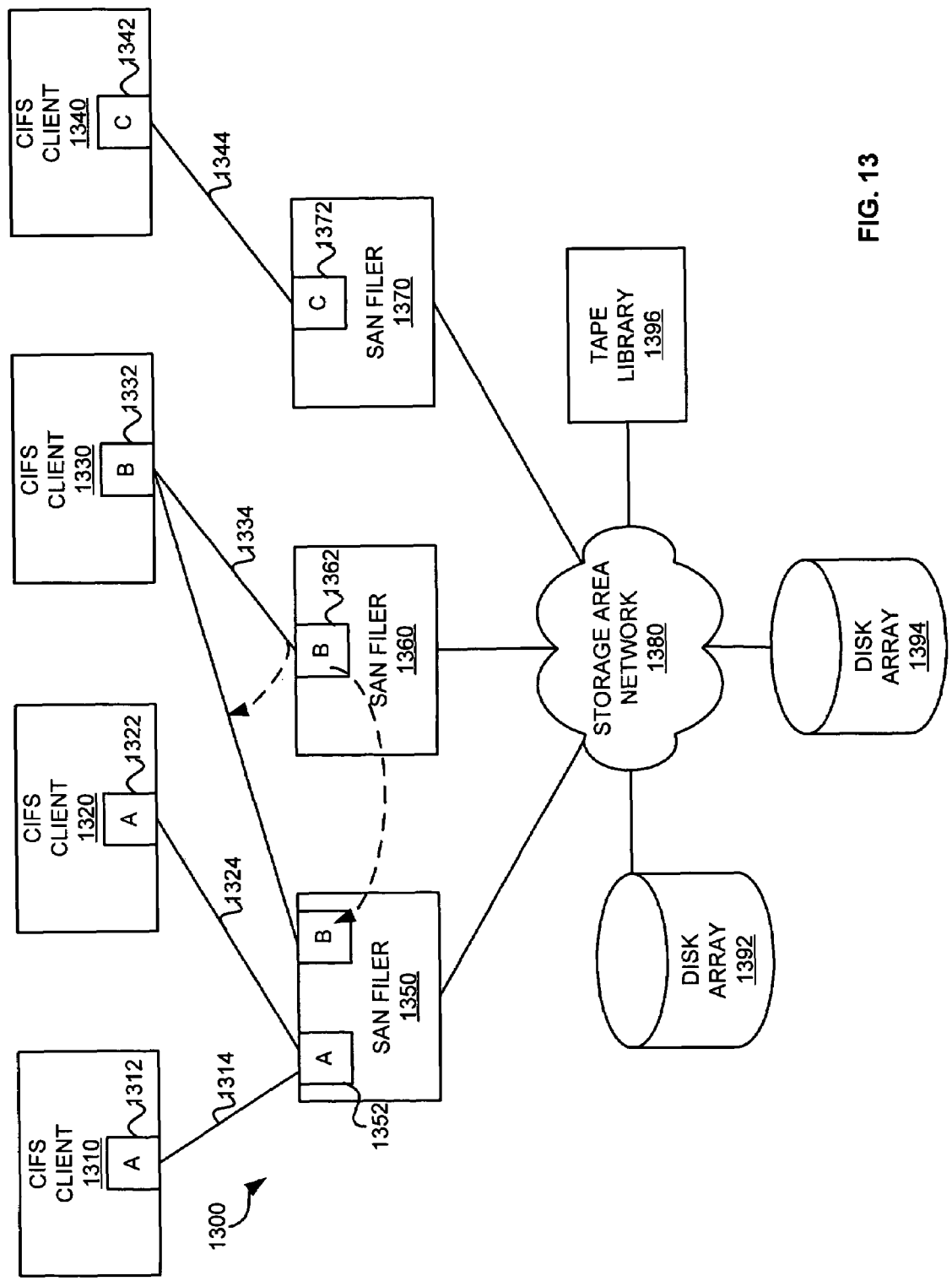
FIG. 13 is a symbolic diagram of a system for transparent movement of file services in an exemplary implementation of the invention.

FIG. 13 depicts a symbolic diagram of a system 1300 for transparent movement of file services in an exemplary implementation of the invention. This embodiment depicts a transfer of file services using CIFS protocols. The system 1300 includes CIFS clients 1310, 1320, 1330, 1340, SAN filers 1350, 1360, 1370, a storage area network 1380, a disk array 1392, a disk array 1394, and a tape library 1396. The storage area network 1380 is coupled to the SAN filer 1350, 1360, 1370, the disk array 1392, the disk array 1394, and the tape library 1396.

The CIFS clients 1310, 1320, 1330, and 1340 are any devices or systems using the CIFS protocol to access file services. One example of the CIFS client 1310 is a LAN client for a user. Another example of the CIFS client 1310 is a web server that accesses files stored on the SAN 1380. The CIFS client 1310 includes state information A 1312 for a TCP connection 1314 to the SAN filer 1350. The SAN filer 1350 also has state information A 1352 for the TCP connection 1314. In some embodiments, the state information A 1312 and the state information A 1352 when combined provide all the state information for the CIFS service. Also, in some embodiments, the state information A 1312 cannot be used to recreate the state information A 1352. The CIFS client 1320 includes state information A 1322 for a TCP connection 1324 to the SAN filer 1350. The CIFS client 1320 includes state information A 1322 for a TCP connection 1324 to the SAN filer 1350.

The CIFS client 1330 includes state information B 1332 for a TCP connection 1334 to the SAN filer 1360. In this example for transparent movement, the SAN filer 1360 is scheduled for servicing at a certain time. The CIFS services that the SAN filer 1360 are providing need to be moved to another SAN filer 1350. This movement advantageously provides continuous CIFS services with minimal interruptions to the file service, which appears transparent to the user. For example, if a user is accessing files through a displayed tree directory, the displayed tree directory and the place where the user was in the tree directory are still intact after the CIFS service is moved from one SAN filer 1360 to another SAN filer 1350. When the CIFS service is moved from the SAN filer 1360 to the SAN filer 1350, the state information B 1362 is transferred from the SAN filer 1360 to the SAN filer 1350. The state information B 1362 is one example of file service data. File service data is any data, information, object, or data structure related to the file service. Some examples of file service data are state information and file management data structures.

The TCP connection 1334 from the CIFS client 1330 to SAN filer 1360 is reestablished from the CIFS client 1330 to the SAN filer 1350. The operations of the transfer of CIFS services are described below in greater detail in FIGS. 15 and 16.

Figure 14:
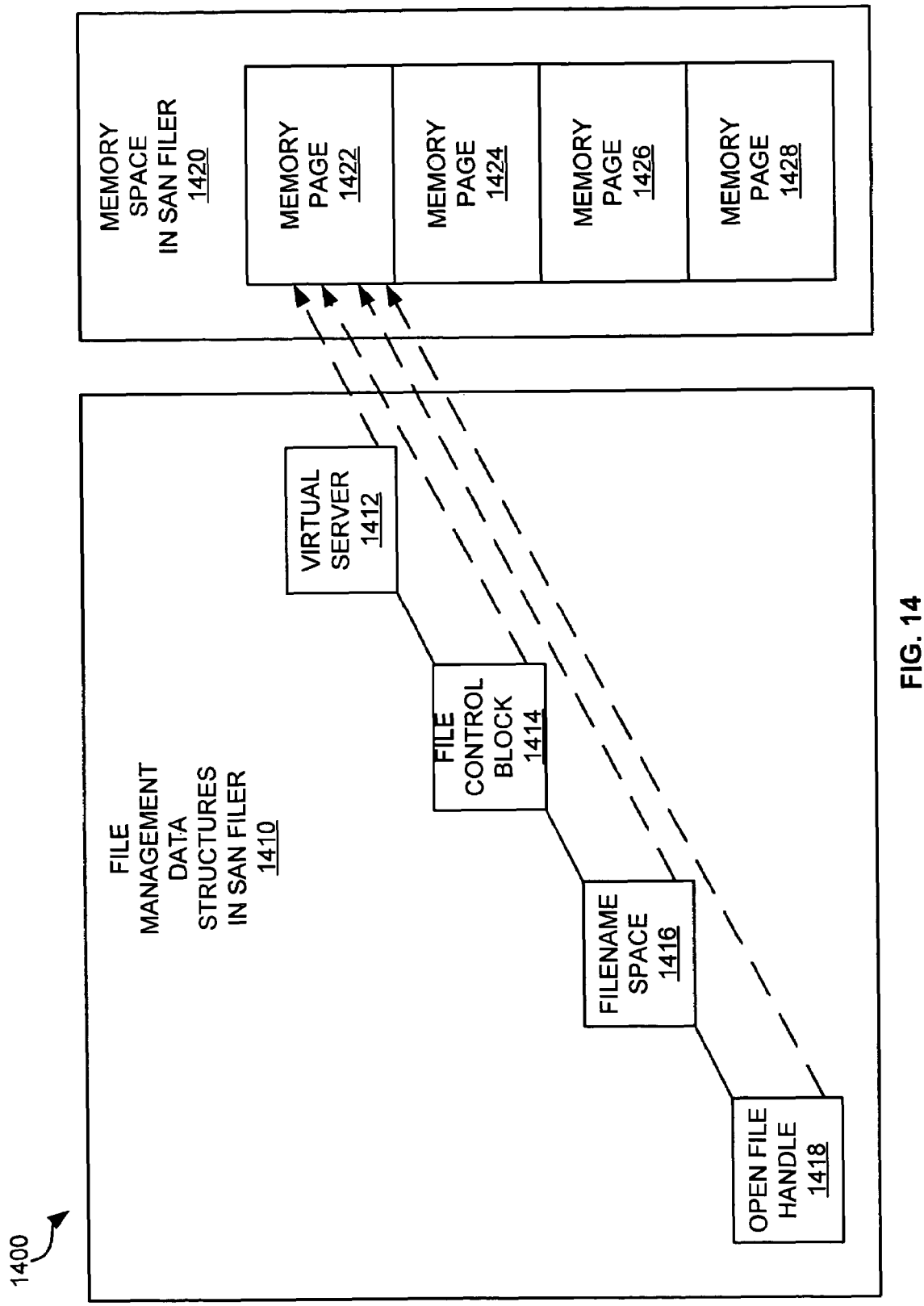
FIG. 14 is a symbolic diagram of file management data structures and memory space in an exemplary implementation of the invention.

FIG. 14 depicts a symbolic diagram of file management data structures 1410 and memory space 1420 in an exemplary implementation of the invention. Both the file management data structures 1410 and the memory space 1420 are located within the SAN filer 1360. Other SAN filers 1350 and 1370 also include file management data structures and memory space but are not shown and discussed for the sake of simplicity.

The file management data structures 1410 are any data for the operation or management of the files for reading, writing, updating, and deleting. This embodiment shows one example of file service data that is allocated to the memory pages 1422, 1424, 1426, and 1428. In this example, the file management data structure 1410 includes a virtual server 1412, a file control block 1414, a filename space 1416, and an open file handle 1418. Besides these four examples of data within the file management data structure 1410, there are other types of data that can be considered as file management data structures 1410. In one embodiment, there are eight to ten different types of file management data structures. Also, the virtual server 1412, the file control block 1414, the filename space 1416, and the open file handle 1418 are each represented by one object of data. There are numerous objects for the data in the file management data structures 1410. Only one of each is shown in FIG. 14 for the sake of simplicity. In one example, there could be millions of objects for the file control block 1414.

The virtual server 1412, the file control block 1414, the filename space 1416, and the open file handle 1418 are shown coupled together in a tree-like structure. In other embodiments, the data of the file management data structures 1410 may or may not be coupled together. Also, there are numerous configurations or organizations in which to organize the data in the file management data structures 1410.

The memory space 1420 includes the memory pages 1422, 1424, 1426, and 1428. The memory space 1420 may have numerous memory pages but only four pages are shown for the sake of simplicity. The memory pages 1422, 1424, 1426, 1428 are any fixed amounts of memory. In some embodiments, the memory pages 1422, 1424, 1426, 1428 are physical pages of memory. In other embodiments, the memory pages 1422, 1424, 1426, 1428 are virtual pages of memory.

The data of the file management data structures 1410 are stored in the memory pages 1422, 1424, 1426, 1428 of the memory space 1420. In one example, the virtual server 1412, the file control block 1414, the filename space 1416, and the open file handle 1418 are stored in the memory page 1422. The operations of storing data from the file management data structures 1410 to the memory space 1420 are discussed in further detail in FIG. 15.

Figure 15:
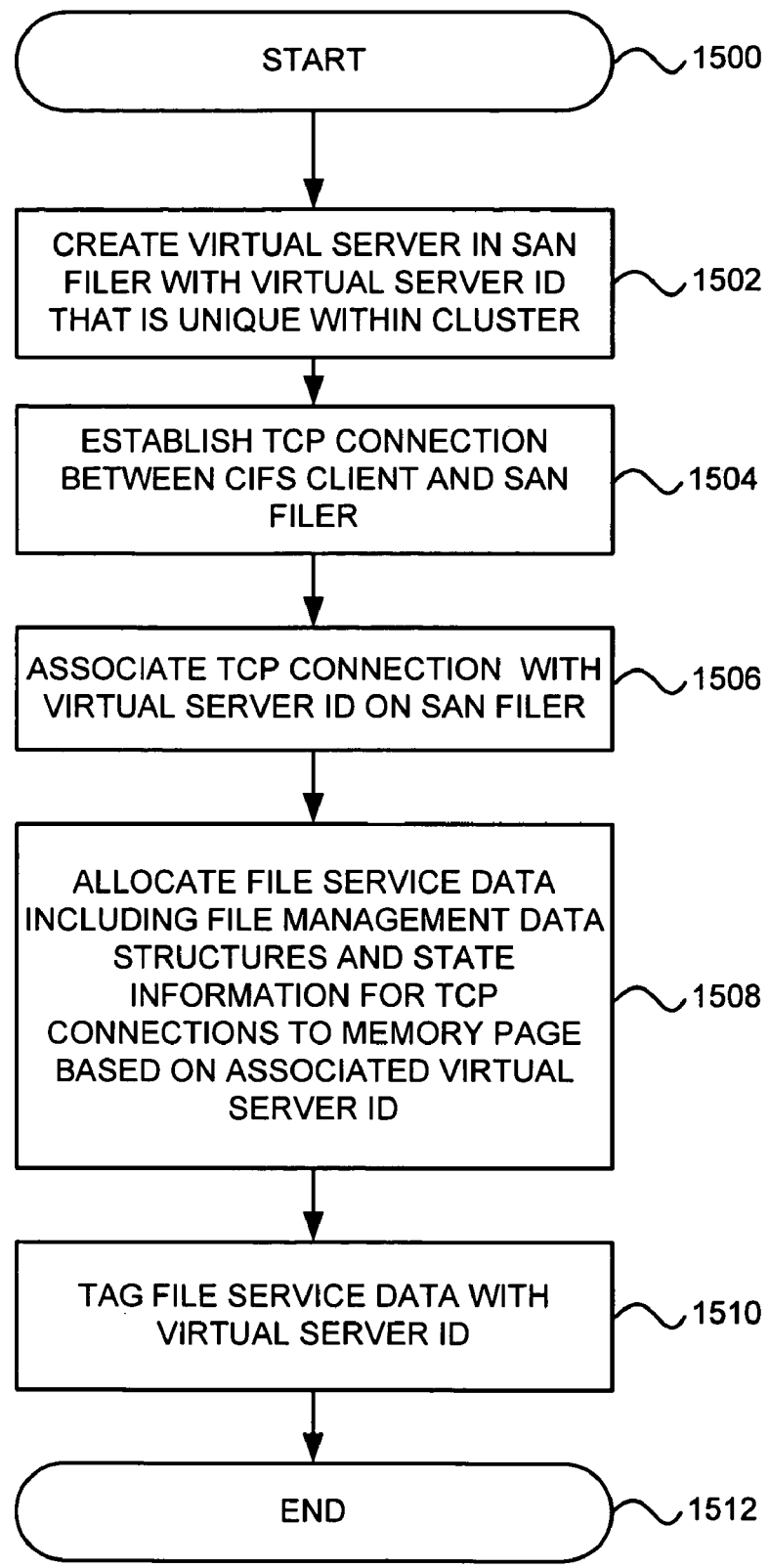
FIG. 15 is a flow chart for storing file service data in memory pages in an exemplary implementation of the invention.

FIG. 15 depicts a flow chart for storing file service data in memory pages in an exemplary implementation of the invention. FIG. 15 begins in step 1500. In step 1502, the SAN filer 1360 creates a virtual server 1412 with a virtual server ID that is unique within a cluster of SAN filers. In step 1504, a TCP connection 1334 is established between the CIFS client 1330 and the SAN filer 1360. In step 1506, the SAN filer 1360 then associates the TCP connection 1334 with the virtual server ID. In step 1508, the SAN filer 1360 then allocates the file service data, including the file management data structures 1410 and the state information for the TCP connection, to the memory page 1422 during the CIFS service based on the associated virtual server ID of the TCP connection. In step 1510, the SAN filer 1360 also tags the file service data with the virtual server ID in step 1510. Allocating the file service data to a memory page by virtual server ID and tagging the file service data allows for a later in time, quick, and efficient transfer of the CIFS service. FIG. 15 ends in step 1512.

Figure 16:
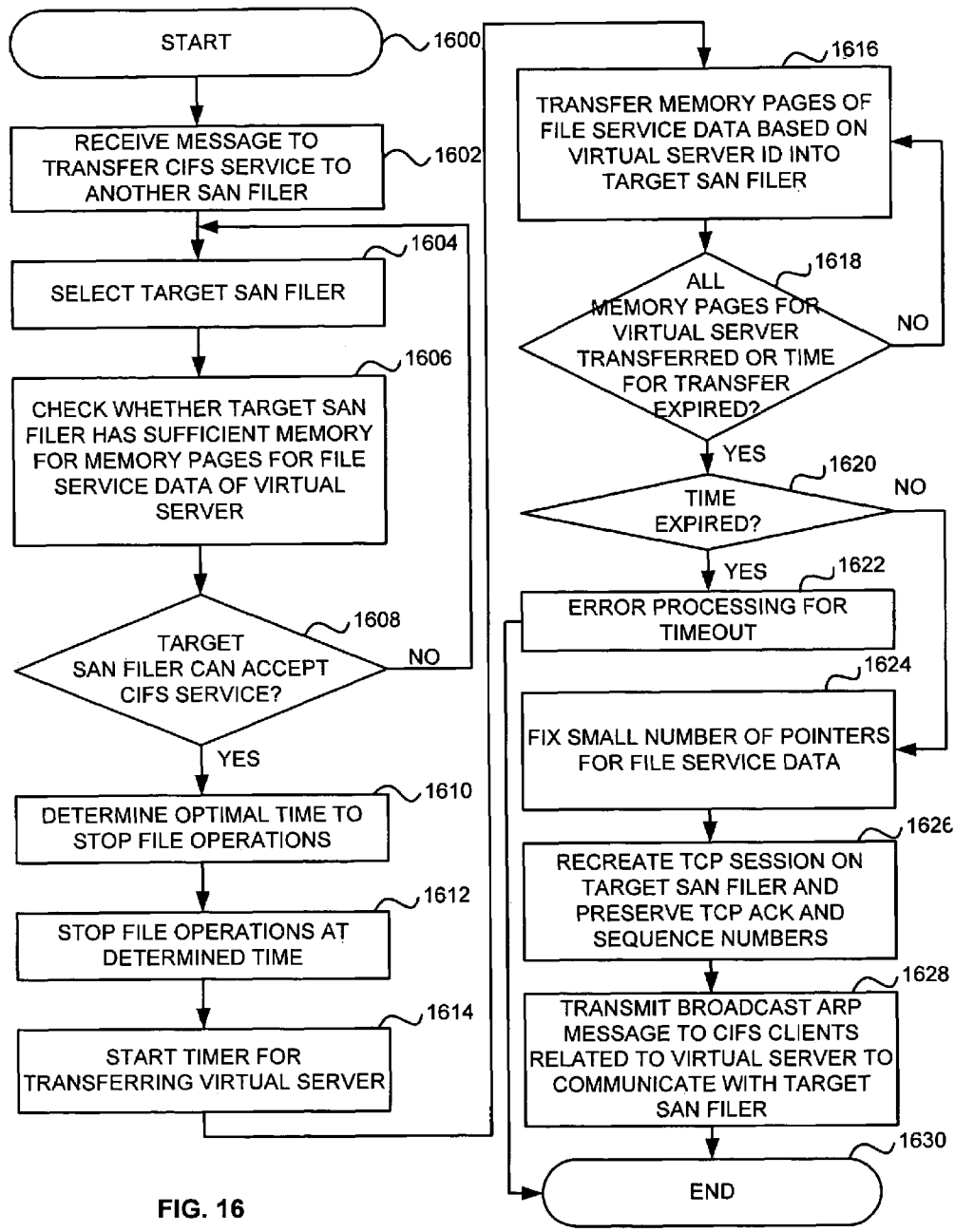
FIG. 16 is a flow chart for transferring a CIFS service in an exemplary implementation of the invention.

FIG. 16 depicts a flow chart for transferring a CIFS service in an exemplary implementation of the invention. FIG. 16 depicts an example of transferring a CIFS service from the SAN filer 1360 to the SAN filer 1350. FIG. 16 begins in step 1600. In step 1602, the SAN filer 1360 receives a message to transfer the CIFS service to another SAN filer. In some embodiments, a network administrator sends the message to the SAN filer 1360 to transfer the CIFS service. In other embodiments, a management system sends the message to the SAN filer 1360 based on a policy for load balancing the SAN filers. In yet another embodiment, the SAN filer 1360 determines whether to transfer the CIFS service due to an overloaded condition or a malfunction.

In step 1604, the SAN filer 1360 selects the target SAN filer 1350. There are numerous criteria that the SAN filer 1360 may use in selecting the target SAN filer 1350 such as proximity, availability, and capability. In some embodiments, the SAN filer 1360 may receive the selection of the target SAN filer 1350. In step 1606, the SAN filer 1360 checks whether the target SAN filer 1350 has sufficient memory for the memory pages of the file management data structures of the virtual server for the CIFS service. In step 1608, the SAN filer 1360 checks whether the target SAN filer 1350 can accept the CIFS service. If the target SAN filer 1350 cannot, the SAN filer 1360 returns to step 1604 to select another target SAN filer.

If the target SAN filer 1350 can accept the CIFS service, the SAN filer 1360 determines an optimal time to temporarily stop the file operations of the CIFS service in step 1610. In step 1612, the SAN filer 1360 stops the file operations of the CIFS service at the determined time. In step 1614, the SAN filer 1360 starts the timer for transferring the virtual server. In some embodiments, the SAN filer 1360 has less than 30 seconds to transfer the CIFS service. In other embodiments, the SAN filer 1360 has less than 10 seconds to transfer the CIFS service due to unacceptable user experienced delays.

In step 1616, the SAN filer 1360 transfers the memory pages of file service data based on the virtual server ID for the CIFS service to the target SAN filer 1360. By transferring the file service data in memory pages, the SAN filer 1360 quickly transfers the large number of data in the file service data to another SAN filer without individually transferring each object of the file service data. When the number of objects of the file management data structures is in the millions, copying of each object is impractical and cannot occur within the time constraints for transferring the CIFS service. By aggregating all the data of file service data into specific memory pages based on the virtual server ID, the SAN filer 1360 can quickly transfer the CIFS service by transferring the memory pages for the CIFS service. Also, another advantage is that the user data is not transferred and remains on the SAN.

In step 1618, the SAN filer 1360 checks whether all memory pages for the virtual server have been transferred or whether time for transferring the CIFS service has expired. If all of the memory pages have not been transferred and the time for transferring the CIFS service has not expired, the SAN filer 1360 returns to step 1616 to transfer the next memory pages for the virtual server ID.

In step 1620, the SAN filer 1360 checks whether the time for transferring the virtual server has expired. If the time has expired, the SAN filer 1360 performs error processing for timeout in 1622.

If the time has not expired, the SAN filer 1360 fixes a small number of pointers to and from the file service data including the file management data structures in step 1624. In some embodiments, the pointers incorporate the virtual server ID within the pointer itself. Therefore, one advantage is that certain pointers using the virtual server ID do not need to be fixed when moved to a different SAN filer 1350 because the virtual server ID has not changed. For example, pointers that point to data within the file management data structure of the virtual server ID do not need to be changed. In the case of millions of objects, the post-processing of fixing pointers is minimized because millions of pointers do not need to be fixed. This minimization of post-processing decreases the overall time used to transfer the CIFS service.

In step 1626, the SAN filer 1350 recreates the TCP session. Also, the SAN filer 1350 preserves the TCP acknowledgements and sequence numbers. In step 1628, the SAN filer 1350 transmits a broadcast Address Resolution Protocol (ARP) message to CIFS clients related to the virtual server to begin communicating with the target SAN filer 1350. In one embodiment, the Internet Protocol (IP) address does not change and is moved to the target SAN filer 1350. The CIFS clients then send their TCP traffic to the target SAN filer 1350. FIG. 16 ends in step 1630.

Figure 17:
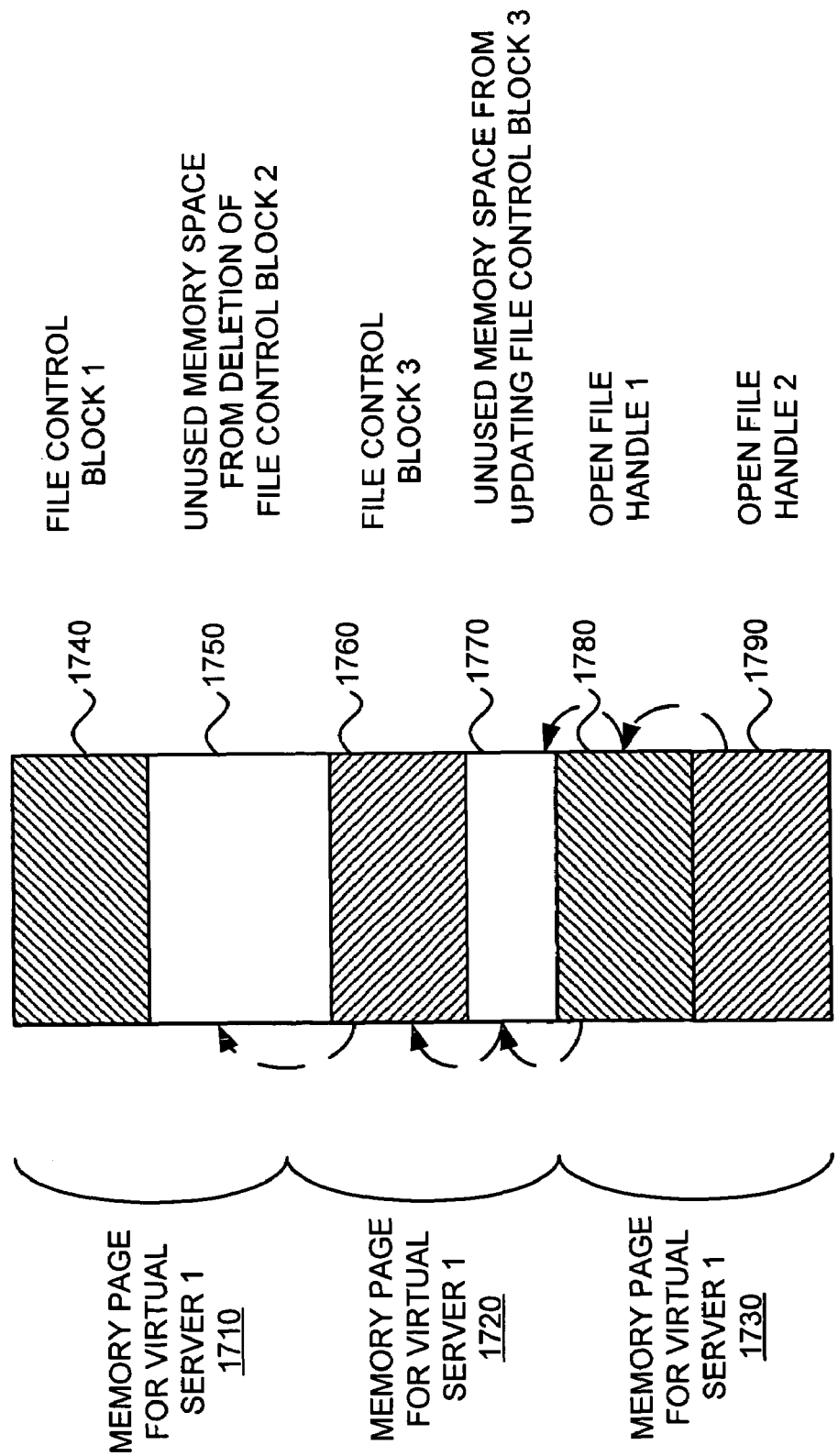
FIG. 17 is a symbolic diagram of memory pages for a virtual server before a compaction in an exemplary implementation of the invention.
Figure 18:
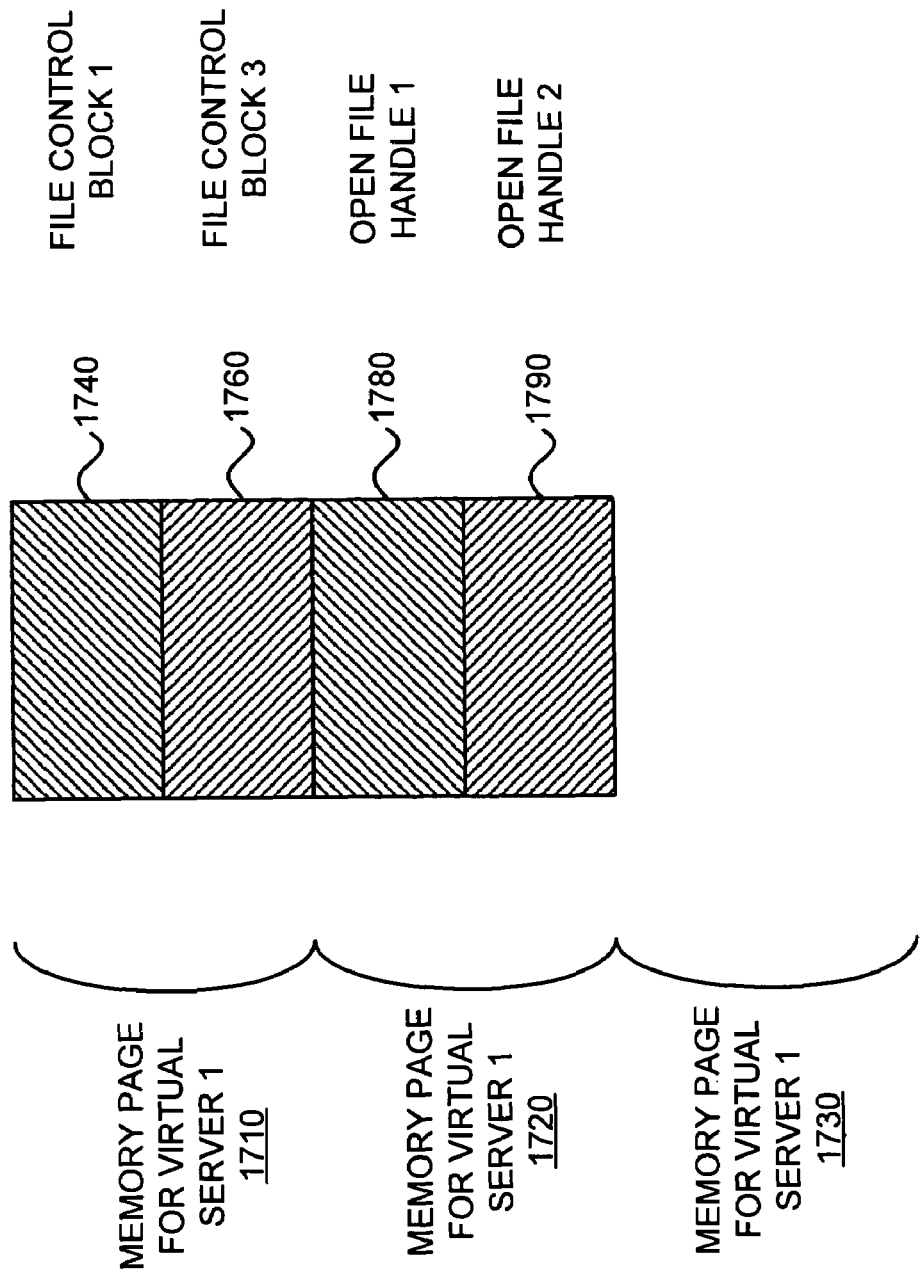
FIG. 18 is a symbolic diagram of memory pages for a virtual server after a compaction in an exemplary implementation of the invention.
Figure 19:
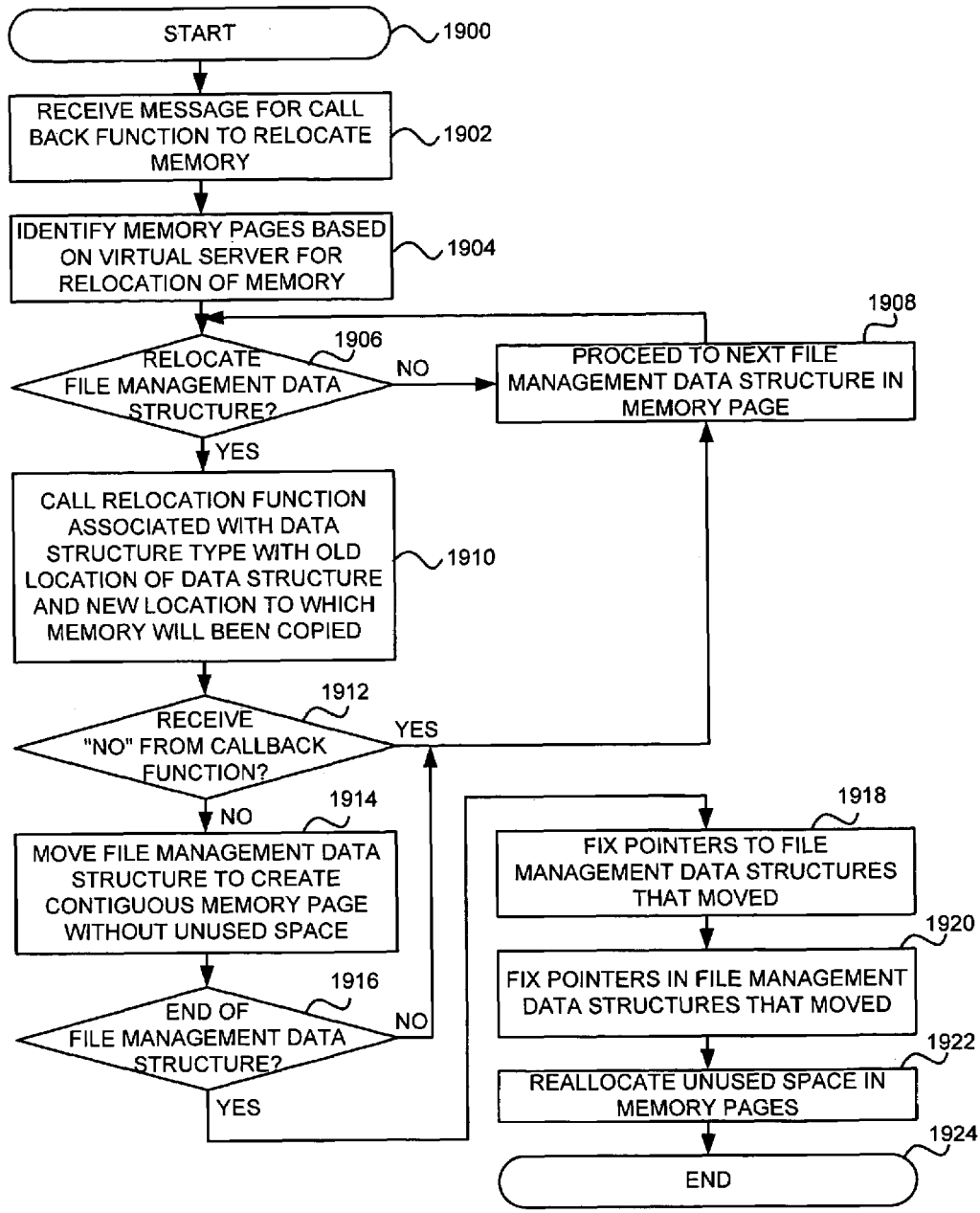
FIG. 19 is a flow chart for compaction of memory pages in an exemplary implementation of the invention.

Memory Page Compaction for Transfer of CIFS Services—FIGS. 17-19

FIGS. 17-19 depict an embodiment for compacting the memory pages for efficient transfer of CIFS services. FIG. 17 depicts a symbolic diagram of memory pages 1710, 1720, 1730 for virtual server 1 before a compaction in an exemplary implementation of the invention. The memory pages 1710, 1720, 1730 include a file control block 1 1740, an unused memory space 1750, a file control block 3 1760, an unused memory space 1770, an open file handle 1 1780, and an open file handle 2 1790. The unused memory space 1750 is the result of a deletion of a file control block 2. The unused memory space 1770 is the result of an updating of file control clock 3 1730. There are numerous examples of how unused space gets created during memory operations, but only two are shown here for the sake of simplicity.

When compaction occurs, the unused memory space 1750 and the unused memory space 1790 are eliminated and the remaining file management data structures are compacted onto possibly fewer memory pages. Thus, the minimum numbers of memory pages are transferred to a target SAN filer 1350 occupying the least amount of unused space. A performance advantage is gained due to the reduced time to transfer the fewest memory pages for a CIFS service.

FIG. 18 depicts a symbolic diagram of memory pages 1710, 1720, 1730 for virtual server 1 after a compaction in an exemplary implementation of the invention. After compaction occurs, the unused memory space is eliminated, and the remaining objects of the file management data structures are contiguous on the fewest number of memory pages. As depicted in FIG. 18, the file management data structures for the virtual server 1 are on two memory pages after compaction as opposed to three memory pages prior to compaction as depicted in FIG. 17. Therefore, when the CIFS service is transferred, only two memory pages are transferred reducing transfer time and optimizing use of memory. The memory page 1730 can then be reallocated for other uses.

FIG. 19 depicts a flow chart for compaction of memory pages in an exemplary implementation of the invention. FIG. 19 begins in step 1900. In step 1902, the SAN filer 1360 receives a message for a call back function to relocate memory. In step 1904, the SAN filer 1360 identifies the memory pages based on the virtual server ID for relocation of memory. In step 1906, the SAN filer 1360 checks whether a file management data structure is to be relocated. If the SAN filer 1360 is not relocating a file management data structure, the SAN filer 1360 proceeds to the next file data structure in the memory page in step 1908 before returning to step 1906.

If the SAN filer 1360 is relocating the file management data structure, the SAN filer 1360 performs a call relocation function associated with the data structure type. The SAN file 1360 passes the old location of the file management data structure and the new location to which the file management data structure will be copied in step 1910. In step 1912, the SAN filer 1360 checks whether a "NO" was received from the callback function. If a "NO" was received from the callback function, then the move of the file management data structure is abandoned, and the SAN filer 1360 returns to step 1908 to proceed to the next file management data structure.

If a "NO" was not received from the callback function, then the SAN filer 1360 moves the file management data structure to create a contiguous memory page without unused space in step 1914. The SAN filer 1360 then checks whether the file management data structure was the last file management data structure for the virtual server ID in step 1916. If the file management data structure is not the last file management data structure for the virtual server ID, then the SAN filer 1360 returns to step 1908 to proceed to the next file management data structure.

If the file management data structure was the last file management data structure for the virtual server ID, the SAN filer 1360 fixes the pointers that point to the file management data structures that moved in step 1918. In step 1920, the SAN filer 1360 fixes the pointers in the file management data structures that moved. In step 1922, the SAN filer 1360 then reallocates the unused space in the memory pages. FIG. 19 ends in step 1924.

Those skilled in the art will appreciate variations of the above-described embodiments that fall within the scope of the invention. As a result, the invention is not limited to the specific examples and illustrations discussed above, but only by the following claims and their equivalents.

What is claimed is:

1. A method of moving a file service within a plurality of storage filers coupled to a communication network and a storage network, the method comprising:

generating file service data for the file service in a first storage filer;

associating the file service with an identification;

allocating the file service data to at least one memory page in the first storage filer based on the identification;

determining an indication to transfer the file service from the first storage filer;

determining an optimal time to suspend file operations of the file service;

identifying a second storage filer at least in part by determining whether the second storage filer has adequate memory for the at least one memory page; and transferring the at least one memory page using the identification from the first storage filer to the second storage filer while file operations are suspended during the optimal time.

2. The method of claim 1 further comprising transmitting a message to clients for the file service connected to the communication network to communicate with the second storage filer.

3. The method of claim 1 further comprising suspending file operations of the file service during the optimal time.

4. The method of claim 1 further comprising reducing unused space in the at least one memory page.

5. The method of claim 1 further comprising fixing pointers related to the at least one memory page.

6. The method of claim 1 wherein determining the indication is based on a policy to transfer the file service from the first storage filer.

7. The method of claim 1 wherein determining the indication further comprises receiving an instruction to transfer the file service from the first storage filer.

8. A system for storage filing, the system comprising:

a first storage filer embodied within a server coupled to a communication network and a storage network; and a second storage filer embodied within another server coupled to the communication network and the storage network;

the first storage filer configured to generate file service data for a file service, associate the file service with an identification, allocate the file service data to at least one memory page in the first storage filer based on the identification, determine an indication to transfer the file service from the first storage filer, determine an optimal time to suspend file operations of the file service, identify a second storage filer at least in part by determining whether the second storage filer has adequate memory for the at least one memory page, and transfer the at least one memory page using the identification from the first storage filer to the second storage filer while file operations are suspended during the optimal time; and the second storage filer configured to receive the at least one memory page.

9. The system of claim 8 wherein the first storage filer is configured to transmit a message to clients for the file service connected to the communication network to communicate with the second storage filer.

10. The system of claim 8 wherein the first storage filer is configured to suspend file operations of the file service during the optimal time.

11. The system of claim 8 wherein the first storage filer is configured to reduce unused space in the at least one memory page.

12. The system of claim 8 wherein the second storage filer is configured to fix pointers related to the at least one memory page.

13. The system of claim 8 wherein the first storage filer is configured to determine the indication is based on a policy to transfer the file service from the first storage filer.

14. The system of claim 8 wherein the first storage filer is configured to receive an instruction to transfer the file service from the first storage filer.

15. A system for storage filing coupled to a communication network and a storage network, the system comprising:

means for generating file service data for a file service in a first storage filer embodied within a server;

means for associating the file service with an identification;

means for allocating the file service data to at least one memory page in the first storage filer based on the identification;

means for determining an indication to transfer the file service from the first storage filer;

means for determining an optimal time to suspend file operations of the file service;
means for identifying a second storage filer at least in part by determining whether the second storage filer has adequate memory for the at least one memory page, the second storage filer embodied within another server; and
means for transferring the at least one memory page using the identification from the first storage filer to a second storage filer while file operations are suspended during the optimal time.

16. A method of moving a file service in a first storage filer located between a communication network and a storage network, the method comprising:
determining an indication to transfer a file service from the first storage filer;
identifying an available storage filer to receive the file service at least in part by determining whether the available storage filer has adequate memory for the at least one memory page;
determining an optimal time to suspend file operations of the file service; and
transmitting at least one memory page with file service data of the file service from the first storage filer to the available storage filer using an identification for the file service while file operations are suspended during the optimal time.

17. The method of claim 16 further comprising: generating the file service data for a file service in a first storage filer; and associating the file service with the identification.

18. The method of claim 16 further comprising allocating the file service data to the at least one memory page in the first storage filer based on the identification.

19. The method of claim 16 further comprising transmitting a message to clients for the file service connected to the communication network to communicate using an address of the available storage filer.

20. The method of claim 16 further comprising suspending file operations of the file service during the optimal time.

21. The method of claim 16 further comprising reducing unused space in the at least one memory page.

22. The method of claim 16 further comprising fixing pointers related to the at least one memory page.

23. The method of claim 16 wherein the file service comprises a Common Internet File System session/service.

24. The method of claim 16 wherein the file service comprises a Network File System session/service.

25. A first storage filer located between a communication network and a storage network, the first storage filer comprising:
a processor configured to determine an indication to transfer a file service from the first storage filer, determine an optimal time to suspend file operations of the file service, and identify an available storage filer to receive the file service at least in part by determining whether the available storage filer has adequate memory for at least one memory page;
an interface configured to transmit the at least one memory page with file service data of the file service from the first storage filer to the available storage filer using an identification for the file service while file operations are suspended during the optimal time; and
a memory configured to store the at least one memory page.

26. The first storage filer of claim 25 wherein the processor is configured to generate file service data for a file service in a first storage filer and associate the file service with the identification.

27. The first storage filer of claim 25 wherein the processor is configured to allocate the file service data to the at least one memory page in the first storage filer based on the identification.

28. The first storage filer of claim 25 wherein the processor is configured to transmit a message to clients for the file service connected to the communication network to communicate using an address of the available storage filer.

29. The first storage filer of claim 25 wherein the processor is configured to suspend file operations of the file service during the optimal time.

30. The first storage filer of claim 25 wherein the processor is configured to reduce unused space in the at least one memory page.

31. The first storage filer of claim 25 wherein the file service comprises a Common Internet File System session/service.

32. The first storage filer of claim 25 wherein the file service comprises a Network File System session/service.

33. A first storage filer located between a communication network and a storage network, the first storage filer comprising:
means to determine an indication to transfer a file service from the first storage filer;
means to identify an available storage filer to receive the file service at least in part by determining whether the available storage filer has adequate memory for at least one memory page;
means to determine an optimal time to suspend file operations of the file service; and
means to transmit the at least one memory page with file service data of the file service from the first storage filer to the available storage filer using an identification for the file service while file operations are suspended during the optimal time.

* * * * *